US008850309B2

(12) United States Patent
Fablet et al.

(10) Patent No.: US 8,850,309 B2
(45) Date of Patent: Sep. 30, 2014

(54) OPTIMIZED METHODS AND DEVICES FOR THE ANALYSIS, PROCESSING AND EVALUATION OF EXPRESSIONS OF THE XPATH TYPE ON DATA OF THE BINARY XML TYPE

(75) Inventors: Youenn Fablet, La Dominelais (FR); Franck Denoual, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 12/864,840

(22) PCT Filed: Mar. 27, 2009

(86) PCT No.: PCT/IB2009/005898
§ 371 (c)(1),
(2), (4) Date: Jul. 27, 2010

(87) PCT Pub. No.: WO2009/118664
PCT Pub. Date: Oct. 1, 2009

(65) Prior Publication Data
US 2011/0010614 A1 Jan. 13, 2011

(30) Foreign Application Priority Data

Mar. 27, 2008 (FR) .................................. 08 51971
Oct. 13, 2008 (FR) .................................. 08 05650

(51) Int. Cl.
*G06F 17/00* (2006.01)
*G06F 17/22* (2006.01)
(52) U.S. Cl.
CPC ........ *G06F 17/2247* (2013.01); *G06F 17/2229* (2013.01)
USPC ......................................... 715/242; 715/234

(58) Field of Classification Search
CPC .................................................. G06F 17/2247
USPC ........... 715/234, 239, 242; 707/713, 716, 726
See application file for complete search history.

(56) References Cited

U.S. PATENT DOCUMENTS 7,162,485 B2 1/2007 Gottlob et al.
7,647,549 B2 1/2010 Denoual et al.
(Continued)

OTHER PUBLICATIONS

Bayardo et al, An Evaluation of Binary XML Encoding Optimizations for Fast Stream Based XML Processing, May 17, 2004, ACM, pp. 1-10.*

(Continued)

*Primary Examiner* — Adam M Queler
*Assistant Examiner* — Howard Cortes
(74) *Attorney, Agent, or Firm* — Fitzpatrick, Cella, Harper & Scinto

(57) ABSTRACT

An object of the invention is in particular methods and devices for analyzing, processing and evaluating expressions of the XPath type on data of the XML type with which coding or decoding tables are associated. After generating a list comprising a set of targets from the XPath-type expression, one target is linked to the coding/decoding table (115). When one part of the set of data is accessed, a reference to an item is identified in the table using the part of data. It makes it possible to access a target linked to the table in order to reconstruct the item (145) and evaluate the expression (150). According to a particular embodiment, a parameter representing the discriminating character of the targets is determined and linked to the table to enable the discriminating character of the targets to be taken into account during the evaluation of the XPath expression on the XML-type data.

18 Claims, 14 Drawing Sheets

(56) References Cited

U.S. PATENT DOCUMENTS

| | | | |
|---|---|---|---|
| 8,185,565 B2* | 5/2012 | Ishizaki | 707/809 |
| 8,250,062 B2* | 8/2012 | Zhang et al. | 707/713 |
| 2003/0163285 A1 | 8/2003 | Nakamura | |
| 2004/0060007 A1 | 3/2004 | Gottlob et al. | |
| 2008/0120351 A1* | 5/2008 | Khaladkar et al. | 707/204 |
| 2008/0244380 A1 | 10/2008 | Ruellan | |
| 2009/0112890 A1* | 4/2009 | Medi et al. | 707/100 |
| 2009/0150412 A1* | 6/2009 | Idicula et al. | 707/100 |
| 2009/0271695 A1 | 10/2009 | Ruellan et al. | |

OTHER PUBLICATIONS

Craig S. Bruce, "CubeWerx Position Paper for Binary Interchange of XML", [Online] Sep. 2003, pp. 1 to 10, XP002491358, available at http:www.w3.org/2003/08/binary-interchange-workshop/05-cubewerx-position-w3c-bxml. pdf>, retrieved on Aug. 5, 2008.

Andrei Arion, et al., "Efficient Query Evaluation over Compressed XML Data", Feb. 2004, Advances in Database Technology—EDBT 2004, pp. 200 to 218, XP019003227.

Andrei Arion, et al., "XQueC: Pushing Queries to Compressed XML Data", Jan. 2003, VLDB: Proceedings of the International Conference on Very Large Data Bases, pp. 1 to 4, XP002491359.

Jun-Ki Min, et al., "XPRESS: A Queriable Compression for XML Data", SIGMOD 2003, Jun. 2003, pp. 122 to 133, XP002530143.

Stephen J. Davis, et al., "Exchanging XML Multimedia Containers Using a Binary XML Protocol", Jul. 2005, IEEE International Conference on Multimedia and Expo, pp. 358 to 361, XP010843836.

\* cited by examiner

```
<?xml version="1.0" ?>
<bookstore>
<book price="17.99">
  <title lang="english">Harry Potter and the Half Blood Prince</title>
  <author>JK Rowling</author>
</book>
<book price="16.47">
  <title lang="french">Les Miserables</title>
  <author>V Hugo</author>
</book>
<book price="26.37">
  <title lang="english">Learning XML</title>
  <author>E T Ray</author>
  <editor>O'Reilly</editor>
</book>
<book price="13.57">
  <title lang="german">Selected Poems</title>
  <author>Goethe</author>
</book>
</bookstore>
```

/bookstore/book/editor

/bookstore/book/title

/bookstore/book/title[@lang = « german »]

Fig. 5

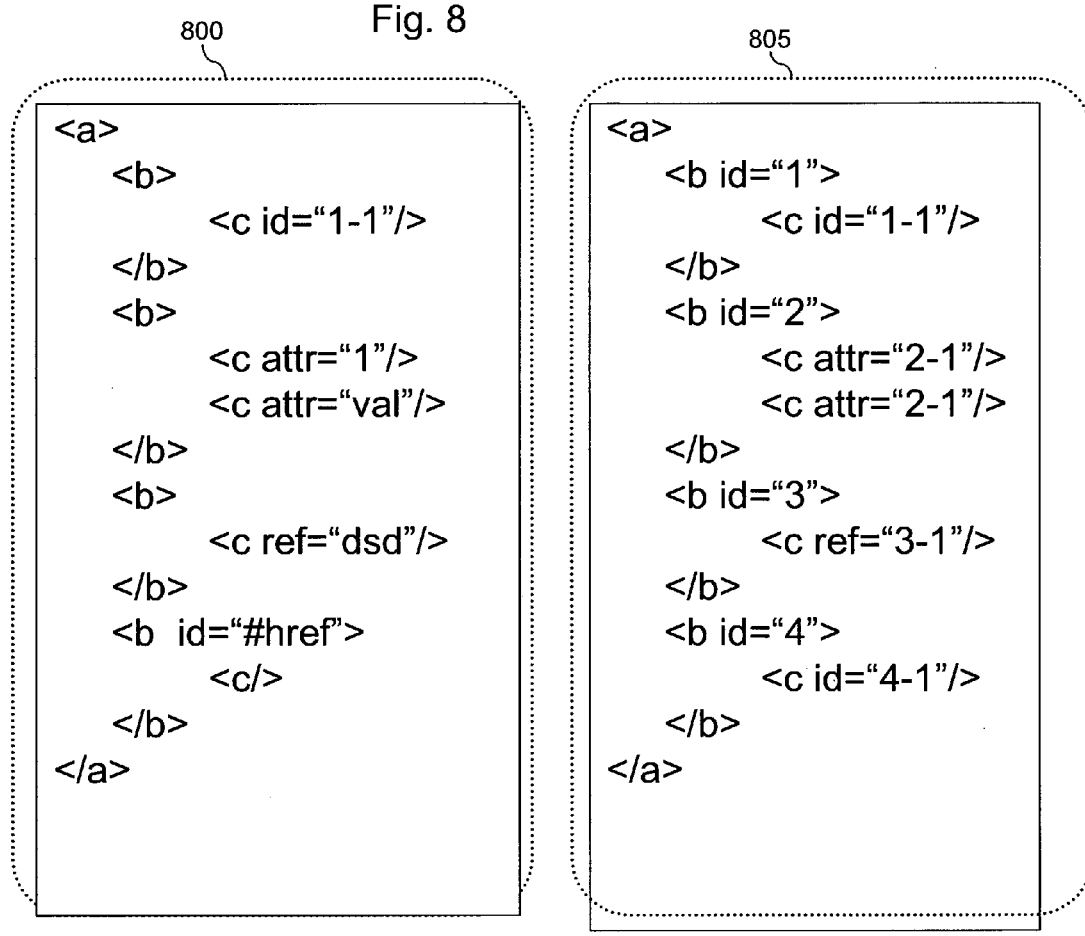
Fig. 8
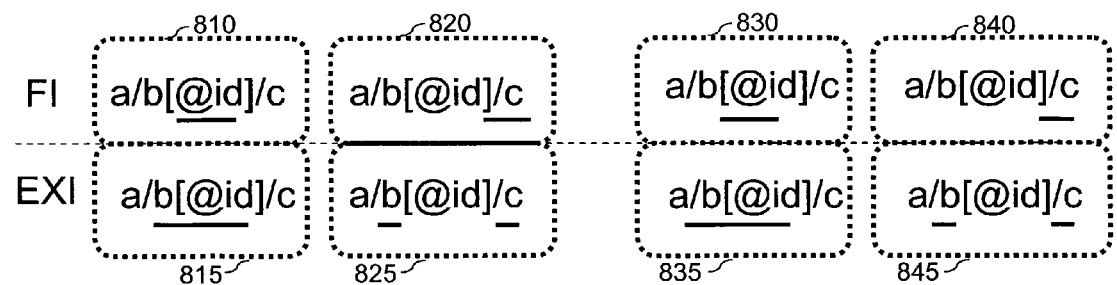

OPTIMIZED METHODS AND DEVICES FOR THE ANALYSIS, PROCESSING AND EVALUATION OF EXPRESSIONS OF THE XPATH TYPE ON DATA OF THE BINARY XML TYPE

The present invention concerns the evaluation of expressions of the XPath type in files of the XML type and more particularly optimized methods and devices for the analysis, processing and evaluation of expressions of the XPath type on data of the binary XML type.

XML (Extensible Markup Language) is a syntax used for defining computer languages. XML makes it possible to create languages adapted for different uses but capable of being processed by common tools.

An XML document consists of elements, each element starting with an opening tag comprising the name of the element and ending with a closing tag also comprising the name of the element. Each element can contain other elements or textual data. An element can be specified by attributes, each attribute being defined by a name and having a value. The attributes are placed in the opening tag of the element they specify.

In the remainder of the description, it is considered that XML data is described by items, each item capable of being in particular an element start, an element end, an attribute, textual content, a comment or a processing instruction.

Furthermore, XML documents can refer to namespaces defined by URIs (Uniform Resource Identifiers). Two elements are identical only if they have the same name and are situated in the same namespace. The use of a namespace in an XML document comes through the definition of a prefix which is a shortcut to the URI of this namespace. This prefix is defined using a specific attribute.

The XML format has many advantages. It has become a standard for storing data in a file or for exchanging data. However, the size of an XML document can be several times greater than the intrinsic size of the data, which can lead to storage, transfer and processing problems.

To overcome these drawbacks, one method consists of encoding the structural data in a binary format instead of using a textual format. Moreover, the redundancy of the structural information in the XML format can be eliminated or at least reduced.

Alternatively, an index table can be used for encoding, in particular, the element and attribute names which are generally repeated in an XML document. Thus, at the first occurrence of an element name, this is encoded normally in the file and an index is associated with it. Then, for the following occurrences of this element name, the index is used instead of the complete character string, reducing the size of the generated document and facilitating reading. Thus, it is no longer necessary to read a complete character string in the file and the element read can be determined by a simple number comparison.

There are other methods, in particular the methods resulting from the Fast-Infoset (acronym for Information Set) and EXI (acronym for Efficient XML Interchange) recommendations, for reducing the size of XML documents and improving the processing of such documents.

The Fast-Infoset recommendations, defined by the standard ITU-T Rec. X.891|ISO/IEC 24824-1, allow a compact representation of an XML document using binary event codes, that is to say binary processing information such as the start or end of an element, and index tables.

According to this specification, the event types are described as a list that uses binary codes of variable length.

The Fast-Infoset recommendations make intensive use of indexing techniques by creating tables for precise sets of XML information. These tables make it possible to encode a given piece of information literally the first time this information is encountered during encoding. This information is added to the table. Subsequently, when the same information is identified, it is found in the table again and the value of the corresponding index is encoded to replace the identified information.

Several indexing tables are therefore used: the prefixes and URIs which define the namespaces are indexed in two specific tables, the attribute values and text node values are indexed in two specific tables, the local attribute and element names are indexed in a specific table and the qualified element names (grouping together prefix, URI and local name) and the qualified attribute names are indexed in two specific tables.

It should be noted that the Fast-Infoset recommendations allow the encoder to decide whether a particular attribute or text node value has to be indexed. This makes it possible in particular to control the size of the memory used by the encoder. The decision to index or not an attribute value or a text node is thus encoded in the bit stream in accordance with the Fast-Infoset recommendations in order to allow the decoder to index or not the decoded values.

A full description of the Fast-Infoset recommendations can be found on the website www.iso.org.

The EXI recommendations, in the process of being developed within W3C, take into account the order of appearance of the different items within a document in order to construct a grammar that makes it possible to encode the most frequent items in a small number of bits.

The EXI recommendations use a set of grammars for encoding an XML document, the grammars serving to encode the actual structure of an XML document. A set of grammars is used for encoding each XML element type present in the document (an XML element type being a set of elements having the same name).

Here a grammar consists of a set of productions, each production comprising an XML event description, an associated encoding value and the indication of the next grammar to be used. For encoding an XML event using a grammar, the production containing the most precise description of the XML event is used. The encoding value contained in this production is used to represent the event. The information contained in the event and not described in the production is encoded.

A grammar evolves. In certain cases, after the occurrence of an XML event described by a production of the grammar (if it is not described by a production, it cannot be encoded by the grammar), the grammar is modified to include a new production corresponding to this XML event. This production can either contain a more precise description of the event, reducing the number of pieces of information to be encoded to represent the event, or have a more compact encoding value.

The encoding values are expressed in the form of priorities having from 1 to 3 levels. Encoding an encoding value amounts to encoding the values of its priority. Each level is encoded in a minimum number of bits in order to be able to encode the largest value of this level associated with a production of the grammar.

The grammar rules used can be generic rules, common to all XML documents and constructed using the XML syntax. They can also be rules specific to one document type, constructed using an XML schema describing the structure of this document type.

During decoding, the reverse process is used: the encoding value is extracted and makes it possible to identify the encoded XML event and the additional information to be decoded.

Moreover, during decoding, the same grammar evolution rules are used, making it possible to have at any time a set of grammar rules identical to that used during encoding.

The following XML document fragment is used by way of illustration to describe the encoding of an XML document using the EXI specification.

```
<person>
    <firstName>John</firstName>
    <lastName>Smith</lastName>
</person>
```

As the encoder has not encountered a "person" element previously, a default grammar is created for this element. It is a grammar containing only generic productions. During the encoding of the "person" element, new productions are inserted in order to make the grammar linked to the "person" element more efficient. The default grammar used for encoding the content of the "person" element is, simplified, as follows:

| ElementContent: | |
|---|---|
| EE | 0 |
| SE (*) ElementContent | 1.0 |
| CH ElementContent | 1.1 | where EE corresponds to the element end event, SE (*) corresponds to any element start event (the name is not specified), and CH corresponds to a textual content event.

During encoding, after receiving the event corresponding to the "person" element start (SE (person)) and after encoding it, the encoder selects the grammar for encoding the content of the "person" element described above.

Next, the encoder receives the event corresponding to the start of the "firstName" element (SE (firstName)). The production that corresponds to this event in the above grammar is the second one:

| SE (*) ElementContent | 1.0 |
|---|---|

The encoder therefore encodes the priority "1.0". As the first priority level comprises two distinct values (0 and 1), this level can be encoded in one bit, with the value 1. Similarly, the second priority level comprises two distinct values and can be encoded in one bit, with the value 0. The priority "1.0" is therefore encoded here with the two bits "10".

Next, as the production does not specify the name of the element, the "firstName" element is encoded.

The process then continues in order to encode the content of the "firstName" element. The rule associated with this element is sought. As no "firstName" element has been encountered, a "firstName" grammar is created from the default grammar. The "firstName" element contains a text node for a single child. When this text node is encoded, the "firstName" grammar is updated by inserting a text production (CH) as follows:

| ElementContent: | |
|---|---|
| Characters | 0 |
| EE | 1 |
| SE (*) ElementContent | 2.0 |
| CH ElementContent | 2.1 |

When the content of the "firstName" element is encoded, the encoder modifies the grammar associated with the "person" element in order to adapt the grammar to the XML data encountered. For this, a new production is added to the grammar, this production corresponding to the start of the "firstName" element. The priority 0 is associated with this production. The other priorities are shifted in order to retain the uniqueness of the priorities. The grammar thus becomes the following:

| ElementContent: | |
|---|---|
| SE (firstName) ElementContent | 0 |
| EE | 1 |
| SE (*) ElementContent | 2.0 |
| CH ElementContent | 2.1 |

The next event is the start of the "lastName" element. Like the "firstName" element, this element is encoded using the following production:

| SE (*) ElementContent | 2.0 |
|---|---|

As the first priority level now has three possible values, it is encoded in 2 bits, with the value 2. The second priority level is still encoded in a single bit. The priority "2.0" is therefore encoded here with the three bits "100".

The name of the "lastName" element is encoded next and then its content is encoded using the grammar associated with it.

Afterwards, the grammar is modified in order to add thereto a production corresponding to the start of the "lastName" element. The grammar then becomes the following:

| ElementContent: | |
|---|---|
| SE (lastName) ElementContent | 0 |
| SE (firstName) ElementContent | 1 |
| EE | 2 |
| SE (*) ElementContent | 3.0 |
| CH ElementContent | 3.1 |

If subsequently, in the document, the encoder encounters another similar "person" element, this element is encoded using this grammar.

Thus the first event corresponding to the content of the "person" element is the start event of the "firstName" element. This element is encoded with the production as follows:

| SE (firstName) ElementContent | 1 |
|---|---|

The production

| SE (*) ElementContent | 3.0 |
|---|---| also corresponds to this event but is less precise in that it does not specify the name of the element. It is therefore the first production that is used.

The encoder therefore encodes the priority of this production (1) with the two bits "01". It is not necessary to encode the name of the element, this being specified by the production.

The encoder next encodes the content of the "firstName" element.

As a production specific to the "firstName" element start event already exists in the grammar, it is not necessary to add a new production to the grammar.

Next, in a similar manner, the encoder encodes the "lastName" element start event, by encoding only the priority 0 with the two bits "00".

Thus it may be noted that, for the encoding of the second "person" element, similar to the first, the generated code is more compact, since it is no longer necessary to encode the name of the elements contained in "person", either literally (by encoding the whole of the character string), or even using an index.

A full description of the EXI recommendations in the process of being developed can be found on the website www.W3C.org.

In the remainder of the description, the encoding tables define all the indexing and/or grammar tables which are kept up to date by an encoder complying with the EXI or Fast-Infoset recommendations.

The XPath standard, whereof the specifications have been developed by the W3C consortium (World Wide Web Consortium), makes it possible to select pieces of information coming from an XML document, possibly combine them and calculate a result from these pieces of information. XPath is a language comprising several types of component: paths for selecting relevant information in the form of a path in a tree, operands for combining pieces of information and/or results via predicates and operators and functions making it possible to calculate results.

An XPath processor must manage this set of components in order to evaluate XPath expressions. The management of the paths is easily adapted to a DOM (Document Object Model) tree model but can also be based on an event-based model of XML documents, such as SAX (Simple API for XML).

For implementing path evaluation in event-based mode, one of the methods developed in the prior art, as presented in the U.S. Pat. No. 7,162,485, consists of segmenting an XPath expression into steps to be validated one after another. The expression a/b/c will then be divided into three parts making it possible to successively search for the three targets a, then b, then c. Here a target represents a step in an evaluation of an XPath expression.

An XPath processor therefore performs the following processing operations:
   compilation of the XPath expression in order to obtain an ordered list of targets which make it possible to select the relevant pieces of XML information and calculate the intermediate or final results; and
   evaluation of the compiled expression on XML data supplied in the form of an XML event bit stream. For each event, the XPath processor determines whether or not a target corresponds to the XML event and, if so, activates the target, that is to say executes the processing associated with the target. This target can activate other XPath targets or processing operations. It can also prepare for the activation of new targets for the XML events to come.

This method can be generalized to several expressions or sub-expressions. Thus the expression a/b[c/e] will be separated into two sub-expressions a/b and c/e; the second sub-expression is evaluated when the first sub-expression has found a potential result and the result of the second sub-expression is used to obtain the final result of the main expression.

Whilst the binary XML technologies generally allow a gain in terms of compression and speed of generation/reading, some of these advantages are inhibited by the use of XPath. This is because the applications in fact partially take advantage of the gain in generation and speed, since they pass through XML abstraction layers of the StAX, SAX, DOM or XPath type, which can reduce the gain in speed. Thus an XPath processor is often based on an XML processing entity (SAX or DOM) and the processing time is generally situated especially at XPath level.

The prior art allows optimized XPath searches using dedicated binary formats that generally take into account the XPath expressions advantageous at encoding time.

However, no solution exists for documents encoded in generic binary XML formats such as binary XML formats meeting the EXI and Fast-Infoset recommendations with no control of the encoding step.

There is therefore a requirement for improving the evaluation of XPath expressions in documents encoded according to binary formats.

The invention makes it possible to solve at least one of the problems described previously.

Thus an object of the invention is a method of analyzing and processing an expression of the XPath type for evaluating said expression on a set of data of the binary XML type, said set of data of the binary XML type being associated with at least one decoding table, this method comprising the following steps:
   generating a list comprising a set of at least one target from said expression of the XPath type, said at least one target representing a step in an evaluation of said expression of the XPath type; and,
   linking said at least one target to said at least one decoding table.

The method according to the invention thus makes it possible to optimize the reconstruction of data of the XML type and the evaluation of expressions of the XPath type without adding any constraint to the data encoding.

Advantageously, the method also comprises a step of analysis of said at least one target, said at least one target being linked to said at least one decoding table in response to said analysis step, in order to determine, in particular, whether said at least one target can be integrated into said at least one decoding table.

According to a particular embodiment, the method further comprises the step of determining, for said at least one target, a parameter representing the discriminating character of said at least one target, said parameter representing the discriminating character, being linked with said at least one target to said at least one decoding table.

The method according to the invention thus makes it possible to associate a parameter representing the discriminating character of the XPath target in order to simplify the management of these targets, the selection thereof being able to be based on their discriminating character, and to optimize the evaluation of the XPath-type expression.

According to a particular embodiment, the method also comprises a step of analyzing said at least one target, said parameter representing the discriminating character of said at least one target being determined according to the results of said analysis of said at least one target. The parameter representing the discriminating character of an XPath target can thus be in particular based on the characteristics of the target itself.

Advantageously, said step of determining said parameter representing the discriminating character of said at least one target comprises a step of estimating the complexity of at least one location path of said XPath-type expression, said at least one target belonging to said at least one location path and said parameter representing the discriminating character being weighted by said estimated complexity.

Still according to a particular embodiment, the method also comprises a step of receiving at least one item of information representing said set of XML-type data, said parameter representing the discriminating character of said at least one target being determined according to said at least one item of information representing said set of XML-type data. The method according to the invention thus makes it possible to refine the values of the parameters representing the discriminating character of the XPath targets according to the structure of the data on which the XPath-type expression is evaluated.

Information representing said set of XPath-type data may in particular be information of the schema type and/or statistical type.

Advantageously, a parameter representing the discrimination character is determined for each target of a plurality of targets of said set of targets, the method also comprising a step of determining the order of evaluation of each target in said plurality of targets according to the parameter representing the discriminating character associated with each target in said plurality of targets in order to optimize the evaluation of the XPath-type expression.

The method also preferably comprises a step of determining the type of said at least one target, said step of linking said at least one target to said at least one decoding table being determined in response to said step of determining the type of said at least one target. Such an embodiment is particularly adapted to the implementation of the EXI recommendations.

Another object of the invention is a method of evaluating at least one expression of the XPath type on a set of data of the binary XML type, said set of data of the binary XML type being associated with at least one decoding table, this method comprising the following steps:
  analyzing and processing said expression of the XPath type according to any one of the preceding claims;
  accessing at least one part of said set of data of the binary XML type;
  identifying at least one reference to an item in said at least one decoding table using said at least one part of said set of data of the binary XML type; and,
    accessing said at least one target linked to said at least one decoding table using said at least one reference.

The method according to the invention thus makes it possible to optimize the communications between a binary XML processor and a processor of the XPath type.

Advantageously, the method further comprises a step of marking or activating said at least one target.

According to a particular embodiment, said step of accessing said at least one target linked to said at least one decoding table comprises the step of accessing a parameter representing the discriminating character associated with said at least one target, using said at least one reference, wherein said at least one target is marked or activated according to the parameter representing the discriminating character associated with said at least one target.

The method according to the invention thus allows a minimal reconstruction of the XML events, which reduces the decoding costs and accelerates the processing. The cost of the navigation phase is thus optimized. In addition, the method according to the invention makes it possible to reduce the size of the XPath processor as well as the quantity of memory required. The method according to the invention can thus easily be implemented in mobile apparatus with limited resources.

The method according to the invention is particularly adapted to the EXI recommendations, the activation of the productions allowing automatic evaluation of the non-discriminating targets. For example, if elements "c" such that "/a/b/c" are sought, no element "c" whose parent is different from "b" is considered since the target corresponds to the passage from b to c rather than a search for a simple element "c".

Advantageously, the method also comprises a step of analyzing said at least one decoding table, in order to determine its nature, as well as preferably a step of creating an item structure in response to this analysis in order to optimize evaluation of the XPath-type expression.

The method preferably also comprises a step of decoding said at least one part of said set of data of the binary XML type.

Another object of the invention is a method of evaluating at least one XPath-type expression on a set of XML-type data, at least one coding table being associated with said set of XML-type data, this method comprising the following steps,
  analysis and processing of said XPath-type expression comprising the steps of,
    generating a list comprising a set of targets from said XPath-type expression;
    determining, for at least one target in said set of targets, a parameter representing the discriminating character of said at least one target; and
    linking said at least one target and said parameter representing the discriminating character to said at least one coding table,
  access to at least part of said set of XML-type data;
  identification of at least one reference to an item in said at least one coding table from said at least one part of said set of XML-type data;
  access to said at least one target linked to said at least one coding table and the parameter representing the discriminating character associated with said at least one target, from said at least one reference; and
  marking or activating said at least one target according to the parameter representing the discriminating character associated with said at least one target.

The method as described previously can thus be implemented in an XML-type document coding system in order to optimize the XPath-type expression evaluation.

Another object of the invention is a computer program comprising instructions adapted to implement each of the steps of the methods described above as well as information storage means, removable or not, able to be read partially or totally by a computer or a microprocessor containing code instructions of a computer program for executing each of the steps of the methods described above.

Another object of the invention is devices for implementing the methods described above, as claimed. The advantages of these devices are in particular similar to the advantages procured by the corresponding methods, as described above.

Other advantages, aims and characteristics of the present invention emerge from the following detailed description, given as a non-limiting example, with regard to the accompanying drawings, in which:

FIG. 5 illustrates an XML document and XPath expressions;

FIG. 8 illustrates an example of implementation of the mechanism presented in FIG. 7 with a particular XPath expression evaluated on two distinct XML documents;

Figure 10:
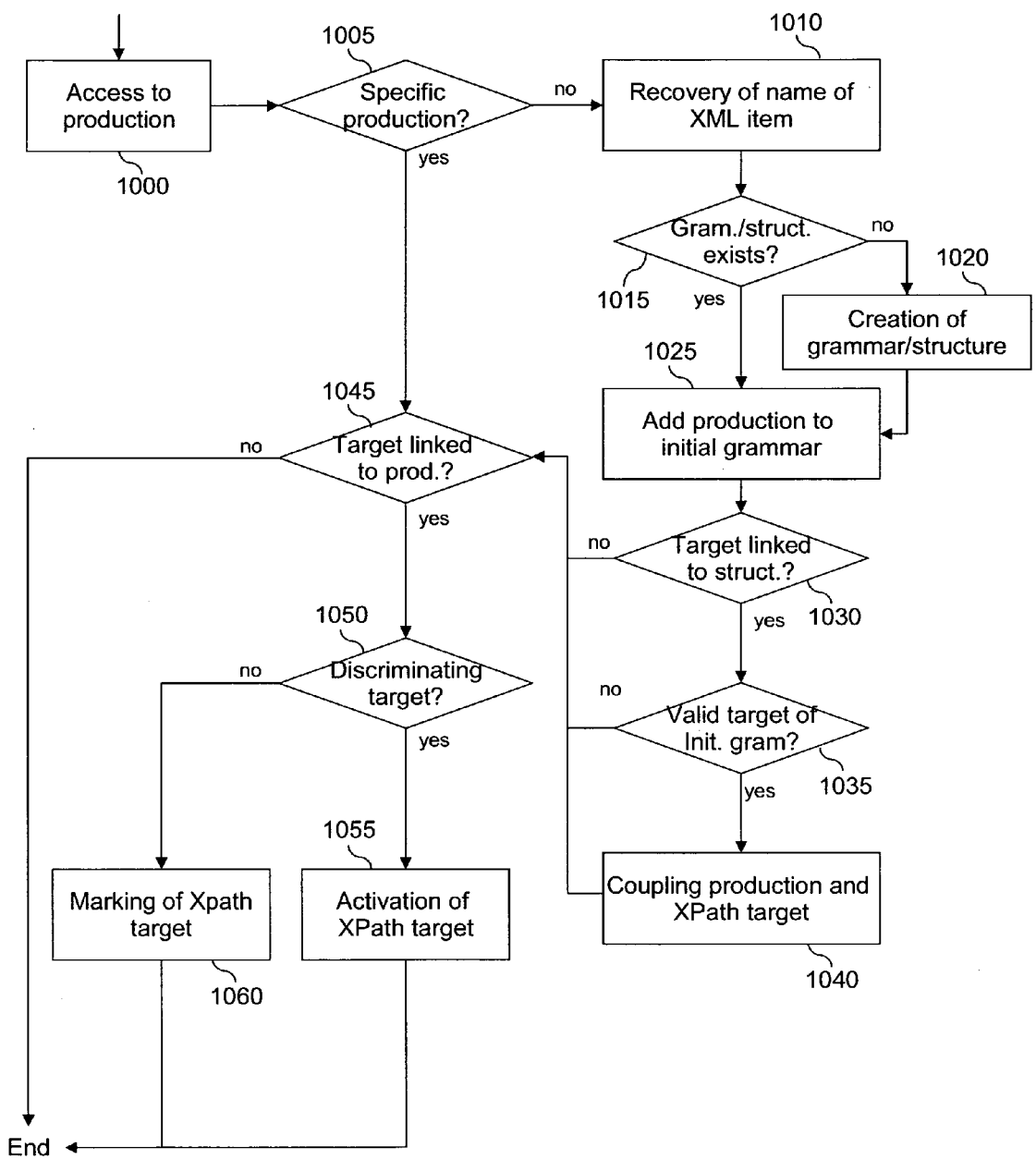
Figure 11:
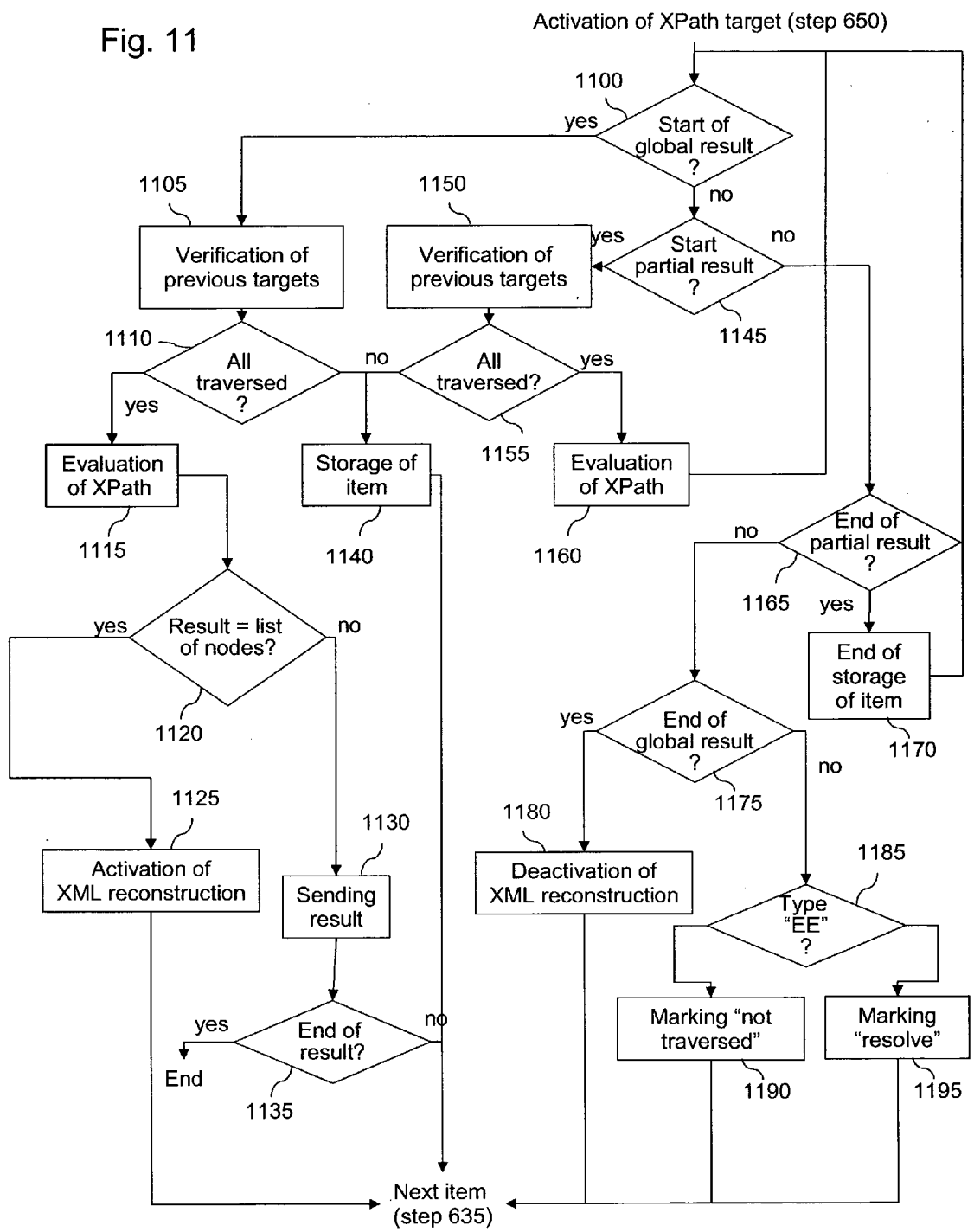
Figure 12:
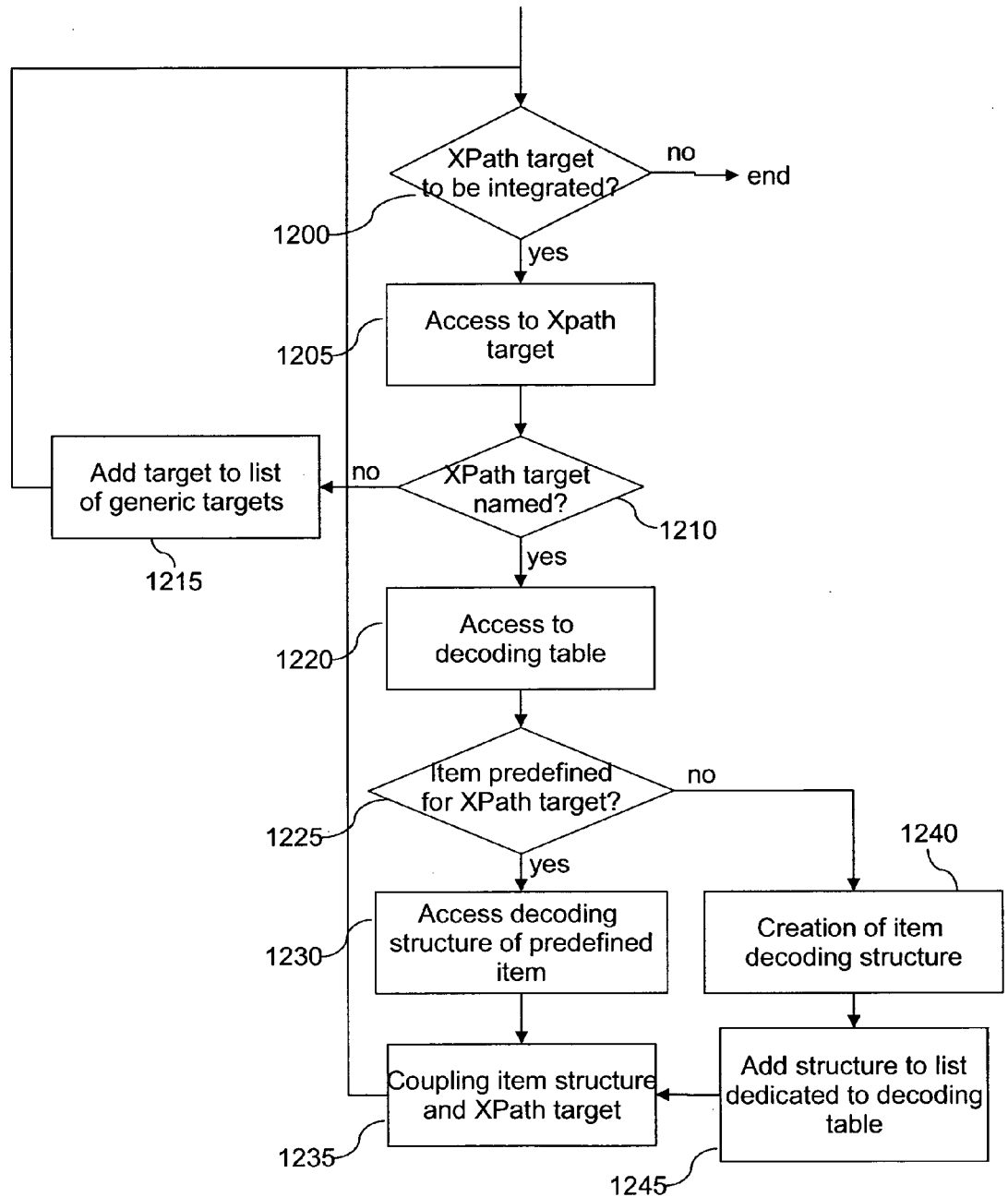
Figure 13:
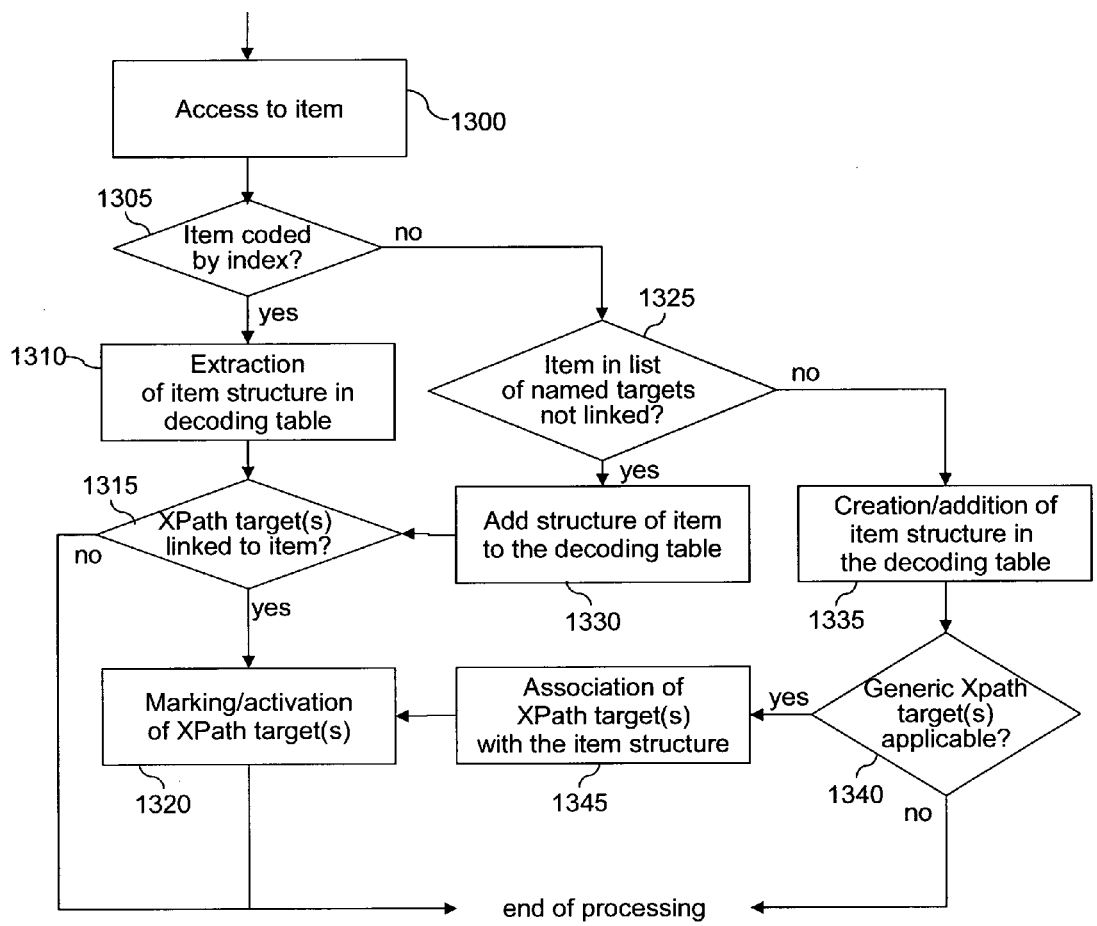
Figure 14:
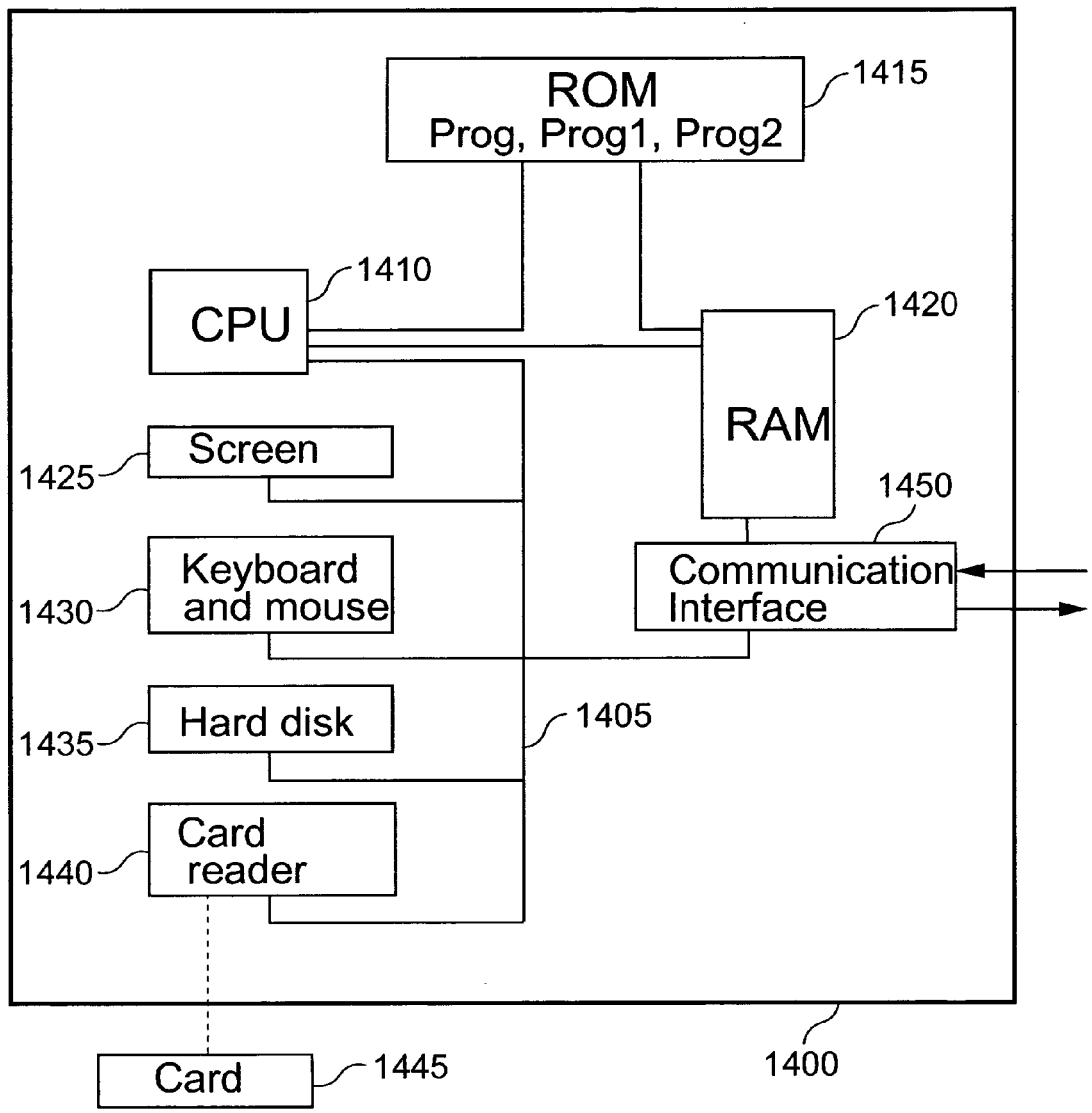

FIG. 10 presents the EXI decoding and the XPath evaluation of an XML item;

FIG. 11 illustrates an example of an algorithm for activating one or more targets having a discriminating character;

FIG. 12 presents an example of a configuration algorithm adapted to the Fast-Infoset recommendations;

FIG. 13 presents an example of an algorithm for decoding a binary XML document of the Fast-Infoset type with the evaluation of an XPath expression; and FIG. 14 shows an example of a device for at least partially implementing the invention.

An object of the invention is in particular to minimize the XML reconstruction and to maximize the processing carried out on the data in binary XML format, in particular by making it possible to evaluate XPath expressions at the time of the binary XML decoding. Examples of implementation of this solution are illustrated in the remainder of the description from codecs of the EXI or Fast-Infoset type.

As indicated previously, the binary XML formats make it possible to avoid coding the names of XML items several times. In general terms, an item is coded by reference to a particular decoding table. This particular table can be defined in advance, by the a priori knowledge of a document in the form for example of a schema, or during encoding (item not present in the table that is inserted).

Thus, according to the invention and in general terms, an XPath expression is combined in a set of XPath targets that is integrated in the decoding tables. When a target is activated during the reading of the decoding tables, the XPath processor performs the necessary processing, for example by requesting XML information. It is thus possible to generate XML events on request.

Figure 1:
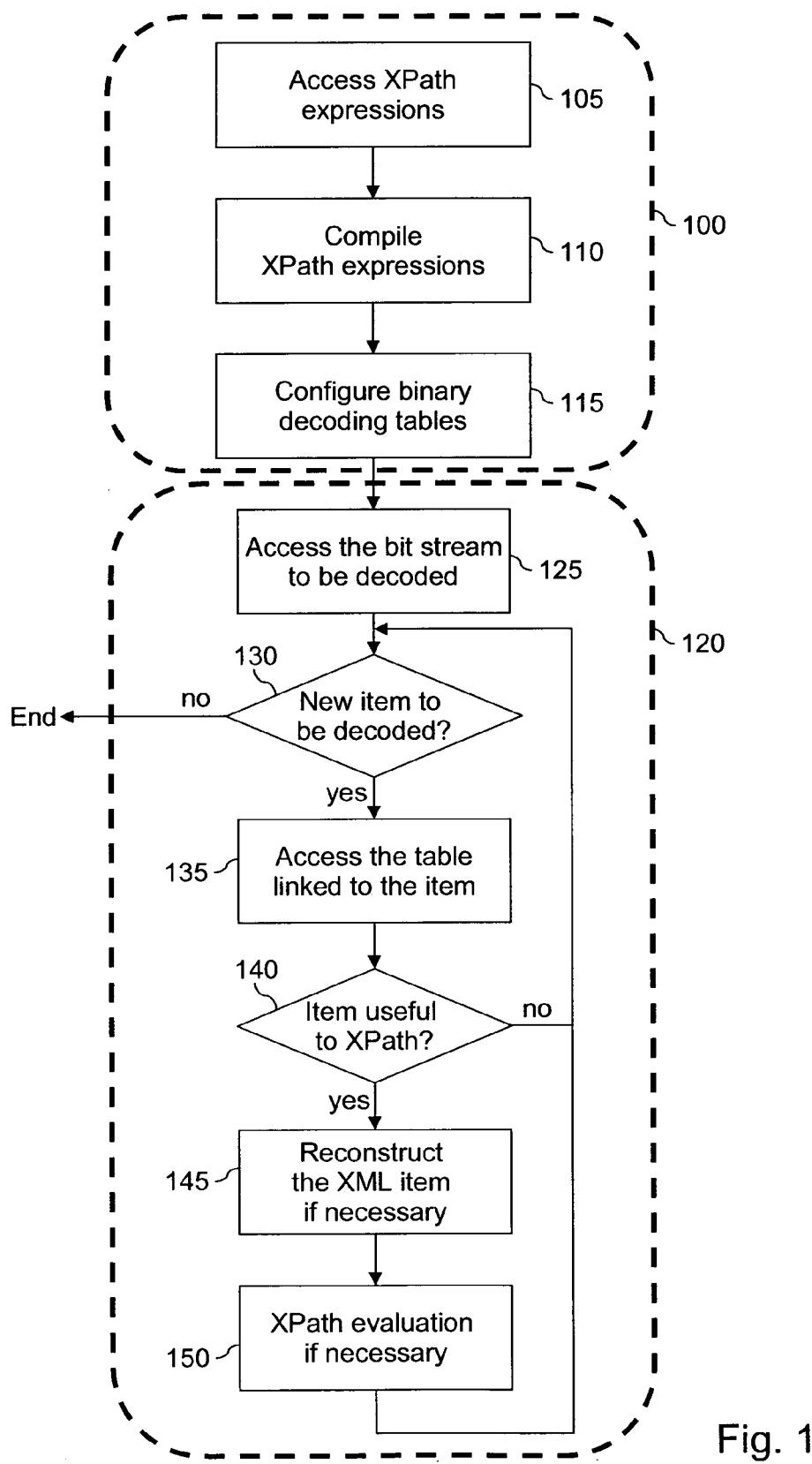
FIG. 1 illustrates schematically an example of algorithm for analyzing and evaluating XPath expressions according to a first embodiment of the invention.

FIG. 1 illustrates schematically an example of algorithm for analyzing and evaluating XPath expressions according to a first embodiment of the invention.

A first phase, referenced 100, makes it possible to analyze the XPath expressions and configure the binary XML decoder. After accessing the XPath expressions (step 105), these are compiled (step 110). The binary decoding tables are then configured with the result of the compilation (step 115).

The object of a second phase, referenced 120, is evaluation of the XPath expressions and decoding of a binary XML bit stream. After accessing the binary XML bit stream to be decoded (step 125), an iteration is carried out on each item (step 130). For each item having to be decoded, the associated decoding table is accessed (step 135) in order to determine whether the item is useful to the XPath evaluation (step 140). If the item is useful to the XPath evaluation, the XML item is reconstructed (step 145) and an XPath evaluation is performed if necessary (step 150).

If the item is not useful to the XPath evaluation, the next item, if there is one, is selected (step 130).

The process stops at the end of the binary XML bit stream or when the XPath evaluation results are known.

It should be noted that several XPath evaluation phases can be based on the same analysis phase in order to avoid the additional cost of compiling the expressions and configuring the decoding tables.

As depicted, the analysis phase comprises compilation of the XPath expressions which makes it possible to generate a list of XPath targets. This compilation step is in particular described in the U.S. Pat. No. 7,162,485, in particular with reference to FIG. 6 which shows a process making it possible to go from an XPath expression to an XPath search tree. Here the compiler performs a lexical and then semantic analysis in order to extract compiled expressions which are then transmitted to the target manager, responsible for activation of these targets according to the XML events transmitted by the XML browser. The compiler part of this diagram is implemented by the invention, the browser and controller part being replaced.

Figure 2:
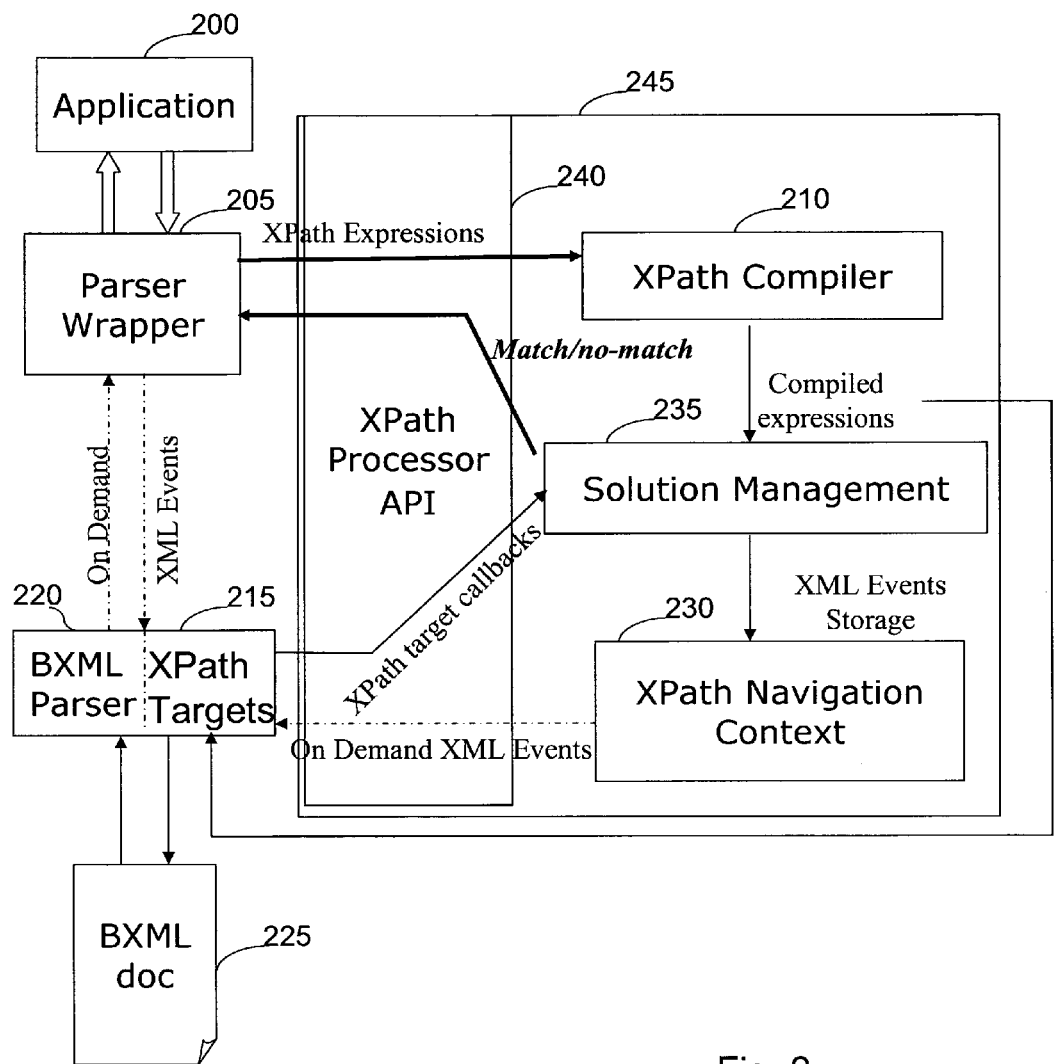
FIG. 2 illustrates an example of application of the invention.

FIG. 2 illustrates an example of the integration of the invention within an XPath processing unit 245 interacting with an application 200 via an XPath Processor API 240. A goal of the application 200 is to retrieve XML data contained in a binary XML document (BXML doc 225). To identify the data to be retrieved in the binary XML document, the application defines an XPath expression, or a set of XPath expressions, that is sent to the XPath processor 245 through a request API of the Parser Wrapper 205. The parser wrapper 205 is making the link between the application 200, the XPath processor 245 and the binary XML parser 220. The parser wrapper 205 sends the Xpath expressions to the XPath compiler 210 that compiles the XPath expressions into a set of XPath targets (215).

Each XPath target is sent, during or after the compilation, to the Binary XML (BXML) parser 220 so that the BXML parser links its decoding table items to the XPath targets. The linking enables fast retrieval of the XPath target from the corresponding decoding item used at decoding time. The linking of the XPath targets to the decoding tables ends the setup for decoding subsequent documents.

When the decoding process starts (at any time after the setup that may happen once for decoding several documents), the BXML parser 220 reads the binary stream and identifies the item to be decoded by reading an item in the decoding table. Once the item in the decoding table is identified, the BXML parser 220 checks whether the XPath targets are linked to the item or not. If so, it calls the solution management unit 235 through XPath target callbacks. The solution manager 235 analyzes these callbacks so as to decide the appropriate action based on the XPath specification. It may decide to wait or to store this XML event in order to take a later decision, in which case it calls the XPath navigation context unit 185 which contacts the BXML parser 220 to retrieve the necessary XML event information (On Demand XML Events arrow). The XPath processor API 240 may also be able to send a final decision (typically Match or No Match) to the parser wrapper 205. The parser wrapper 205 then sends the result information to the application 200 through a dedicated API (represented by arrows on the Figure). If there is a match, the application is able to retrieve the result information through the BXML Parser 220 (On Demand XML events) or through the XPath Navigation Context, also represented on the Figure as "On Demand XML Events".

Step 115 of the analysis phase depicted in FIG. 1 consists of integrating the XPath targets directly into the decoding tables. This step, combined with the XPath expression compilation step 110, is detailed in FIG. 3 which illustrates a generic algorithm capable of being adapted according to the binary XML format used, for example complying with the EXI or Fast-Infoset recommendations.

An iteration is performed on each XPath expression to be compiled (step 300). After compiling the selected XPath expression (step 305), an iteration is then performed on the targets of the compiled XPath expression (step 310). After accessing a target of the compiled XPath expression (step 315), a test is performed in order to determine whether this target has to be integrated into the decoding tables (step 320).

This last step depends in particular on the underlying binary format and the form of the decoding structures. This is because certain XPath targets cannot easily be integrated into the decoding structures. For example, the XPath expression '/a/*' contains the step corresponding to '/*' which does not integrate directly into the decoding structures belonging to the Fast-Infoset recommendations.

If it is possible to integrate the XPath target, this is integrated into the decoding tables (step 325). This step depends very much on the form of the decoding tables and therefore on the underlying binary XML format. If it is not possible to integrate the XPath target or after having integrated it, the next target, if there is one, is selected.

The algorithm ends when the last XPath expression has been compiled and all the targets of the XPath expressions have been processed.

The integration of several XPath targets into the decoding structures can possibly lead to a large number of XPath targets associated with the same decoding structure. In this case, it is possible to use target factorization methods to reduce the number of targets. This factorization step can in particular be performed using a criterion dependent on the number of targets linked to a particular item.

Figure 4:
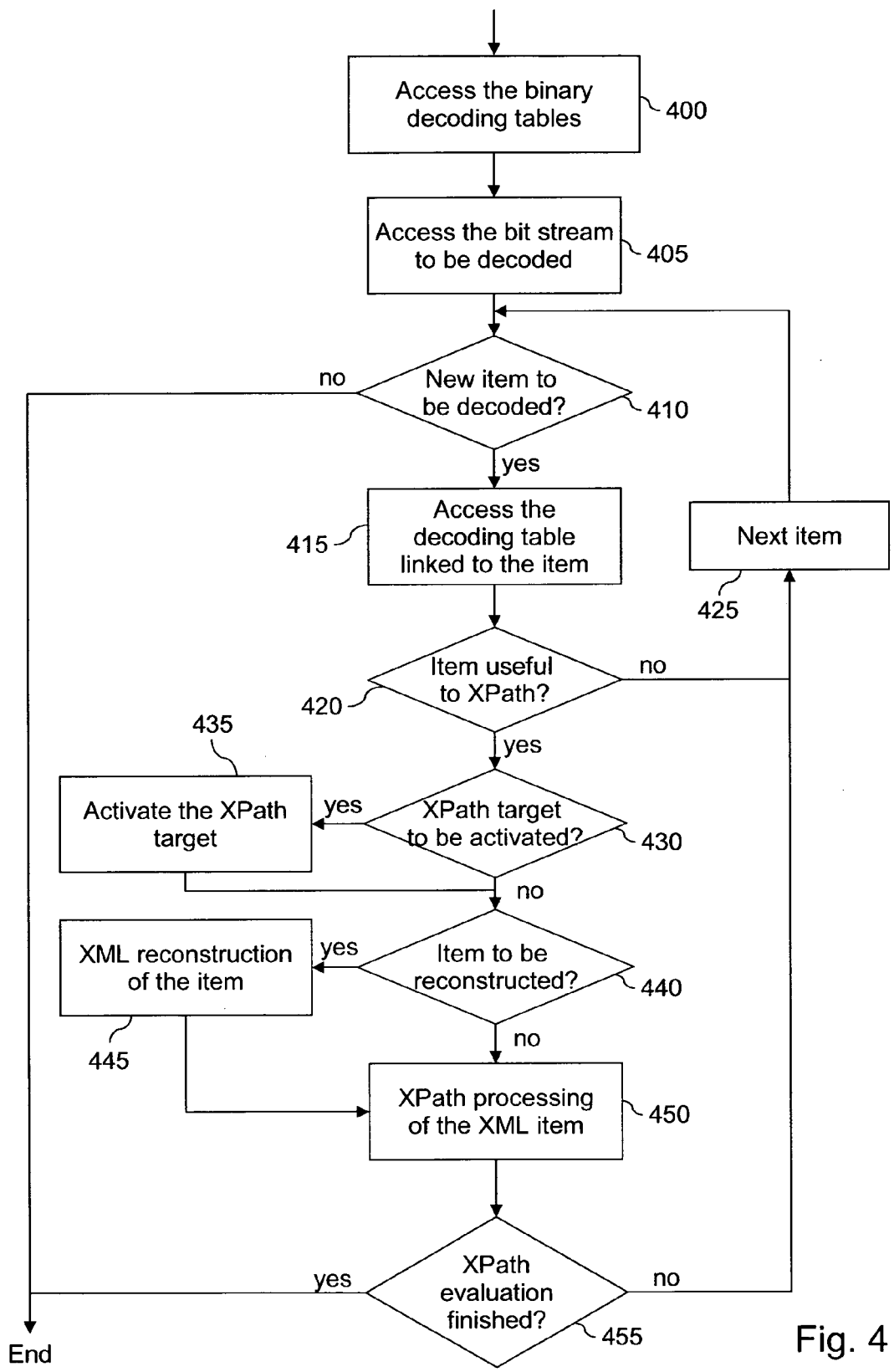
FIG. 4 illustrates more precisely an example algorithm for evaluating expressions of the XPath type according to a first embodiment of the invention.

The XPath evaluation step of FIG. 1 is detailed in FIG. 4. Here it is depicted generically, this example having to be customized for defined binary XML formats, such as binary XML formats complying with the EXI or Fast-Infoset recommendations.

Figure 3:
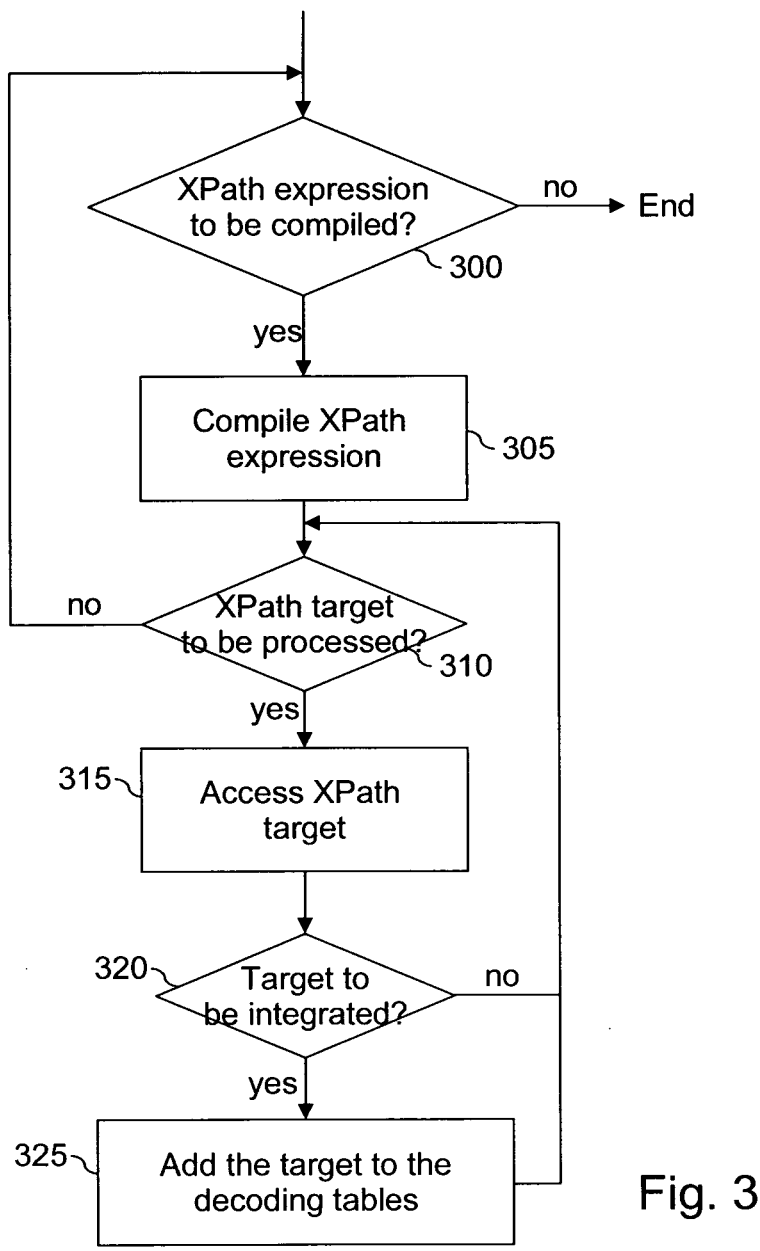
FIG. 3 illustrates more precisely an example algorithm for analyzing expressions of the XPath type according to a first embodiment of the invention.

After accessing all the decoding tables correctly configured for evaluation of the XPath expressions (step 400), that is to say tables configured according to the algorithm illustrated in FIG. 3, and receiving a binary XML bit stream to be decoded (step 405), an iteration is performed on each item to be decoded (step 410). For each item, the decoding table associated with it is accessed (step 415). It is thus possible to determine whether an XPath target is associated with the item via its decoding table.

A test is then performed in order to determine whether the item is useful to the XPath evaluation (step 420). This step can be based on a global field, in particular when it is necessary to store the XML item or if there is an XPath target associated with the item. If the item is useful to the evaluation, a test is performed in order to determine whether it is necessary to activate the XPath target (step 430). If it is necessary to activate the XPath target, this is activated (step 435).

Following activation of the XPath target or in the case where no activation is necessary, a test is performed in order to determine whether the XML event has to be reconstructed (step 440). This decision is taken by the XPath processor and can be global or decided upon following activation of the XPath target. If XML reconstruction is necessary, the XML reconstruction of the item is performed (step 445).

After reconstructing the item or in the case where it is not necessary to reconstruct it, the XML item is processed according to the XPath expression (step 450). This can be, for example, storing the XML item, transmitting it to the application or using it as an intermediate result.

A test is then carried out in order to determine whether the XPath evaluation is finished (step 455). If the XPath evaluation is finished, the process ends, otherwise the next item is selected (step 325).

Similarly, if the item is not useful to the XPath evaluation (step 420), the next item is selected (step 425) and, if there is no new item to be decoded (step 410), the process ends.

According to a second embodiment, the invention takes into account the discriminating character of the expressions to be evaluated in order to avoid the inopportune activation of certain navigation targets. For these purposes, the navigation targets combined from the XPath expressions to be evaluated include information reflecting their discriminating character, that is to say a parameter representing the discriminating character, also referred to as the indicator of the discriminating character in the remainder of the description.

FIG. 5 illustrates an XML document 500 able to be used for evaluating the XPath expressions 505, 510 and 515.

Because of the nature of the document 500, the last step of the XPath expression 505 is the most discriminating since it produces a single result. Conversely, the last step of the expression 510 has a lesser discriminating character compared with the last step of the expression 505. The expression 515 intrinsically has a highly discriminating step, that is to say here the step "@lang" with the value "german". These examples illustrate that the indicator of the discriminating character can be calculated from the XPath expression and can be enhanced using knowledge of the document on which it is evaluated or the information relating to the model of the document.

After having determined the indicator of the discriminating character of each of the navigation targets of the XPath expressions to be evaluated, this is used to determine the order of evaluation of these targets. This operating mode, more advanced than an approach of the "top-down" and "bottom-up" type, makes it possible to limit the number of tests not producing any solution and therefore to improve the processing time for XPath evaluations on documents of the binary XML type.

Figure 6:
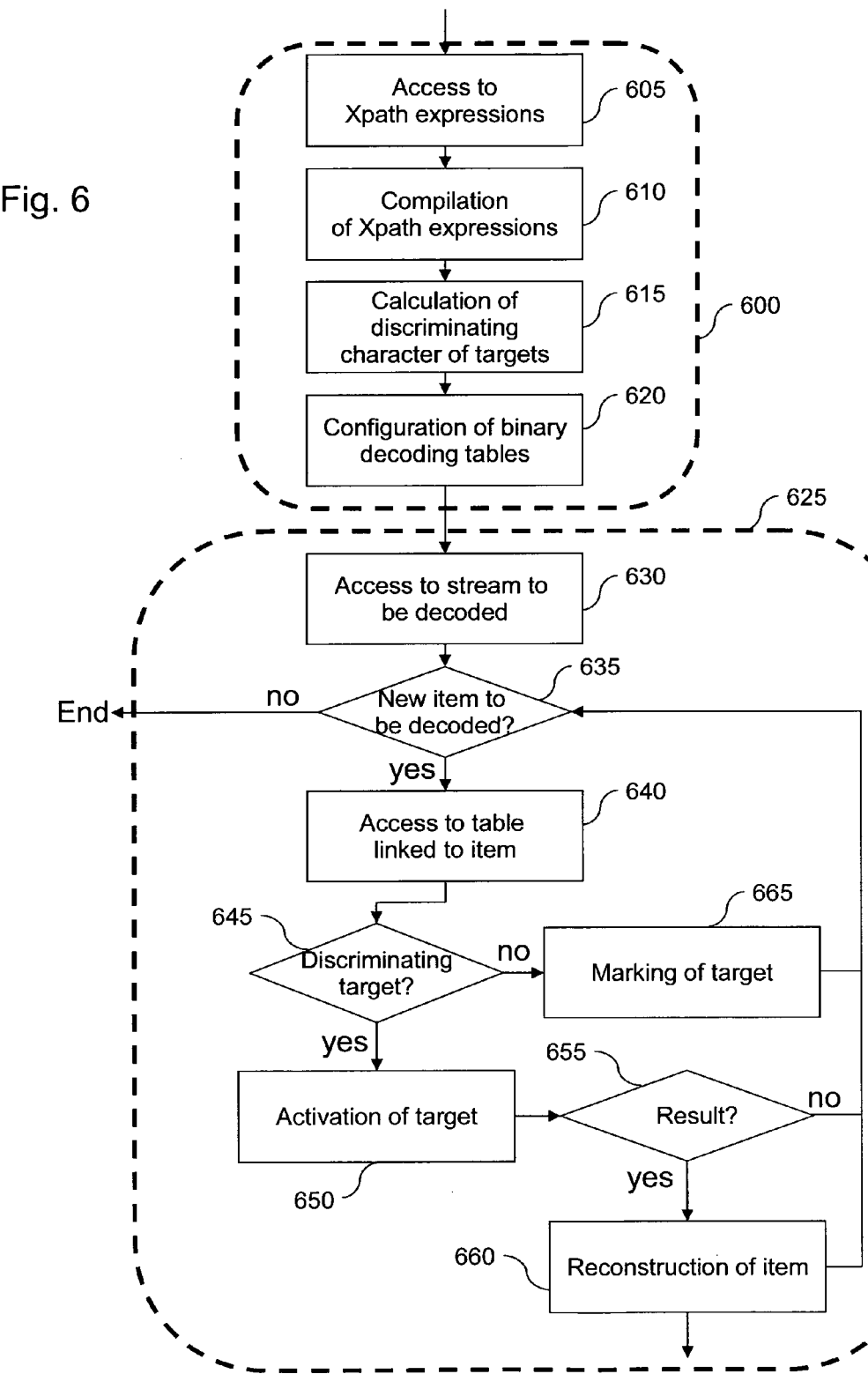
FIG. 6 illustrates schematically an example of an algorithm for analyzing and evaluating XPath expressions according to the invention.

FIG. 6 illustrates schematically an example of an algorithm for analyzing and evaluating the XPath expressions according to the second embodiment of the invention. This generic algorithm can be particularized for specific binary XML formats such as those in accordance with the EXI and Fast-Infoset recommendations.

A first phase, referenced 600, makes it possible to analyze the XPath expressions and to configure the binary XML decoder. After having accessed the XPath expressions in order to generate a list of XPath targets (step 605), these are compiled in a standard fashion (step 610). The compilation step 610 is for example the one described in the patent application US 2004/0060007. It is a process for passing from an XPath expression to an XPath search tree such as the one illustrated in FIG. 8.

During this step, the compiler performs a lexical and then semantic analysis in order to extract compiled expressions, which are transmitted to a target manager responsible for the activation of these targets according to the XML events transmitted by the XML browser.

The indicator of the discriminating character of each target identified is then calculated (step 615). This step is described in detail with reference to FIG. 7 and leads to a list of XPath targets classified according to their discriminating character.

The XPath targets are then directly integrated in the decoding tables (step 620). An indicator of the discriminating character being associated with each XPath target, several integration modes can be used. According to a first implementation of the second embodiment, all the XPath targets are integrated in the decoder, for example an EXI decoder, a test on the discriminating character then being carried out during evaluation. One of the advantages of this implementation is the possibility of refining the indicator of the discriminating character of all the XPath targets according to the documents actually evaluated. However, a test must be added at the time of evaluation in order to determine whether the XPath target has a sufficiently discriminating character to activate the XPath processor.

According to another implementation of the second embodiment, only the sufficiently discriminating XPath targets are integrated in the decoder. The advantage of this implementation is in particular to limit the processing and utilization cost of the memory by eliminating in particular the test on the indicator of the discriminating character and the need to link the binary XML processor with XPath targets that do not serve for the activation, which may be detrimental in the case of evaluation of multiple XPath expressions. However, according to this implementation, the updating of the indicator of the discriminating character is less direct in that this indicator can be updated only on the XPath targets integrated in the decoder.

A second phase, referenced 625, has as its object the evaluation of the XPath expressions and the decoding of a binary XML stream from the previously configured decoding tables. After having accessed the binary XML stream to be decoded (step 630), an iteration is made on each item (step 635). For each item that is to be decoded, the associated decoding table and the XPath target having the discriminating character with the highest indicator of the XPath targets identified are accessed (step 640) in order to determine whether this XPath target is associated with this item.

A test is then carried out in order to determine whether this XPath target is discriminating or not (step 645) using the indicator of the discriminating character of the target calculated at step 615. If the current target is discriminating, it is activated (step 650), which immediately triggers an evaluation by the XPath processor. Following this evaluation another test is performed in order to determine whether or not a result is achieved (step 655).

This test consists for example of verifying that the parent targets of the current target have all been traversed (evaluation of the bottom-up type). If such is the case and if the current target is the last target of the expression then the obtaining of a result is signaled by the XPath processor to the decoder. This signaling places the decoder in a so called reconstruction mode indicating to it that it should reconstruct the current item (step 660).

If the activation of the target does not lead to the obtaining of a result, the decoder continues on the items up to the last one (step 635). It is therefore the list of targets organized according to their indicator of the discriminating character that guides the evaluation and that allows both a top-down and a bottom-up evaluation. It makes it possible to cancel out the evaluation cost for the non-discriminating intermediate targets.

If the current target is not discriminating (step 645), it is marked as traversed (step 665) in order to indicate that the corresponding item has already been encountered. In the case where the item information already encountered is stored directly by the binary XML processor (by means of the history of the XML elements and/or the binary XML structures necessary for the processing), this marking step can be eliminated. During this marking, if the target concerns the search for an attribute, a text node or a comment node, the identifier representing its value (entry in the dictionary of values) is stored at the target. This allows the a posteriori resolution of steps such as the steps [@price<20] and [@lang="german"].

It should be noted that the evaluation phase is described here only in the case of decoding. However, the invention can also be implemented in the coder. This is because, if an application needs to analyze an XML document, during the compression of this document, for purposes of routing, traceability (logging) or collection of statistics, this can be done by the evaluation of XPath expressions during coding. The algorithm used would then be similar to the one in FIG. 6, where step 620 would relate to the configuration of the coding tables, the stream accessed in step 630 would be the XML stream to be coded and step 635 would concern access to the XML item to be coded. The outputs would on the one hand be the results of the evaluation of the XPath expressions (step 660) and a binary XML stream corresponding to the compressed XML stream.

As indicated previously, the indicator of the discriminating character is used to determine whether or not an XPath target must activate the XPath processor. The XPath expression is represented in the form of a series of XPath targets each having an indicator of the discriminating character. At any time in the XPath evaluation, only the XPath target having the highest discriminating character is sought. At the start of the search, the XPath target sought is therefore the XPath target of the expression where the indicator of the discriminating character is the highest.

When this target is found, the XPath target where the indicator of the discriminating character is the highest in all the Xpath targets remaining to be traversed is sought. At each step of activating an XPath target, a new XPath target is activated in the case where the activated target is not terminal.

By way of illustration, if the XPath expression is a/b[@d]/e/f[@g='test']/h, the XPath targets designated as discriminating are b->@d and f->g for EXI and the attribute d and then the attribute g for Fast-Infoset. In this case, the targets corresponding to the attributes d and g are integrated and declared as discriminating. The activation of the targets (step 650) is performed in the presence of one of these two attributes. If the attribute d is encountered, the parent XPath targets are validated. If the attribute g is then encountered, the parent XPath targets (corresponding to the elements e and f) are validated until the target corresponding to the attribute d is validated.

Several criteria can be used to determine the discriminating character of the compiled targets. Advantageously, the indicator of the discriminating character of each target can be refined between two successive evaluations. The initial value of this indicator is given by the analysis of the expression to be evaluated. This value can also be refined statically by the transmission to the XPath compiler of information of the schema type or statistics obtained from a set representing documents to be evaluated. The result of this calculation is a list of targets with which there is associated an indicator called DC (the abbreviation of Discriminating Character) in the remainder of the description. The higher this indicator, the more important the target is in the evaluation of the expression from which it comes. The value zero indicates here a target without any discriminating value.

Figure 7:
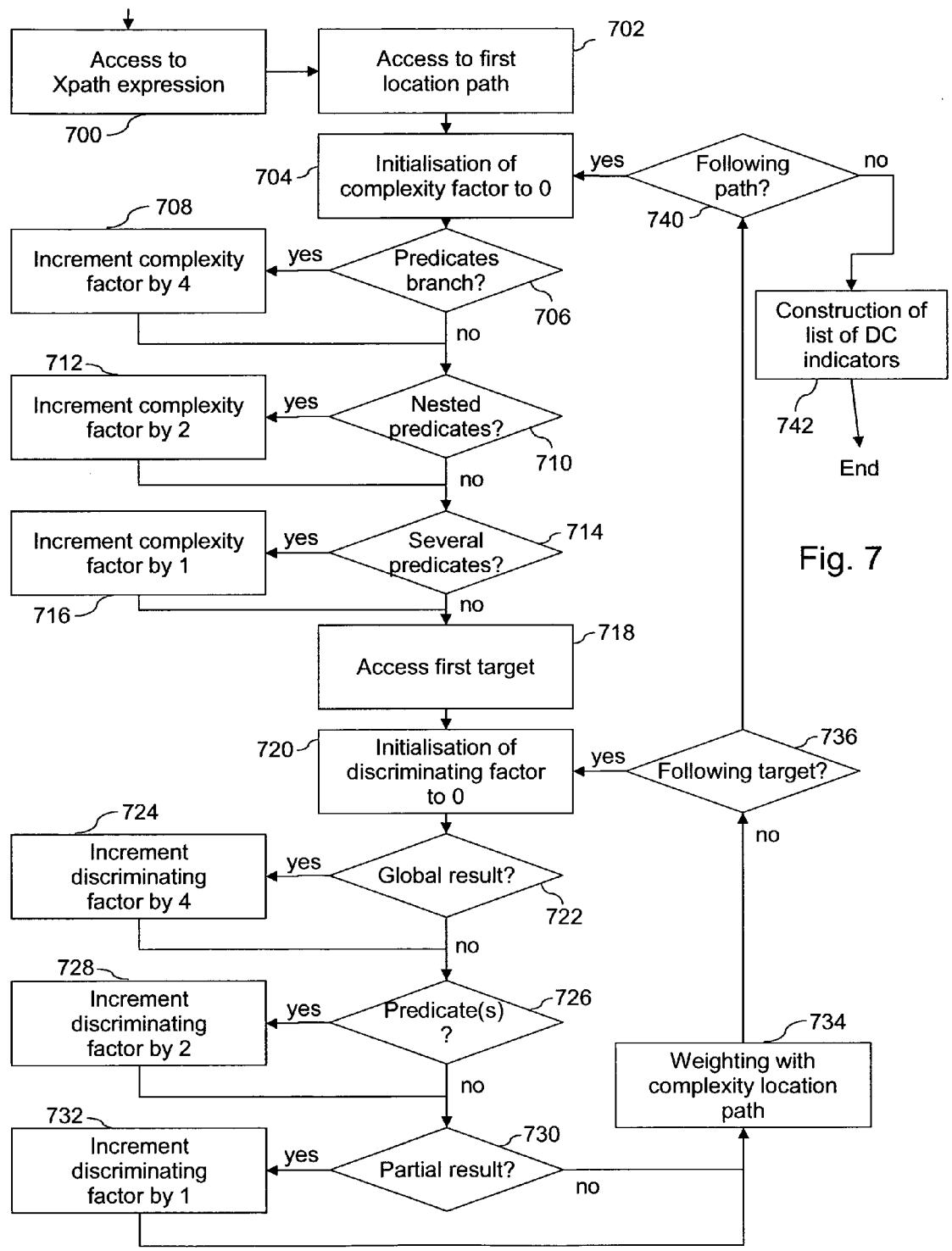
FIG. 7 represents an example of an algorithm able to be used for calculating the indicator of the discriminating character of XPath targets.

The static analysis of the XPath expressions in order to determine the indicator of the discriminating character of each of their targets (step 615 in FIG. 6) is described with reference to FIG. 7.

It should be remarked here that though, for reasons of clarity, steps 610 and 615 in FIG. 6 are presented successively, they can be performed in parallel, step 615 preferably being implemented by the XPath compiler.

The calculation of the indicator of the discriminating character of the targets of an XPath expression is carried out in two phases. The object of a first phase is to calculate an estimation of complexity of each LocationPath of the XPath expression (steps 704 to 716) while the object of a second phase is the calculation of a discriminating factor of each target of each location path of the XPath expression to be evaluated (step 718 to 732), the indicator of the discriminating character of a target being obtained from its discriminating factor weighted by the complexity of the corresponding LocationPath (step 734).

A first step of the first phase consists of accessing the compiled representation of the XPath expression (step 700) to then make it possible to access the compiled representation of the first LocationPath of this expression (step 702). The complexity factor of this LocationPath is initialized to zero (step 704).

A first test is next carried out (step 706) in order to determine whether the current LocationPath contains predicates known as branches (a predicate is said to be of the branched type if it is situated at an intermediate step on a LocationPath). In the affirmative, the complexity factor is incremented by 4 (step 708).

If the current LocationPath does not contain a branch predicate (step 706) or after having incremented the complexity factor by 4 (step 708), a second test is performed (step 710) in order to determine whether the current LocationPath contains nested predicates, that is to say for example a predicate c in the LocationPath /a[b[c]]. In the affirmative, the complexity factor is incremented by 2 (step 712).

If the current LocationPath does not contain any nested predicate (step 710) or after having incremented the complexity factor by 2 (step 712), a third test is performed (step 714) in order to determine whether the current LocationPath contains multiple predicates (by way of illustration, the LocationPath /a[b][c][d] contains three predicates in the same step). In the affirmative, the complexity factor is incremented by 1 (step 716). The complexity factor thus obtained is stored with the compiled representation of the LocationPath.

The second phase begins with access to the first target of the current LocationPath (step 718). The discriminating factor associated with this target is initialized to zero (step (720).

A first test is then performed (step 722) in order to determine whether the current target may give rise to a global result for the current expression (generally the last target of a LocationPath). In the affirmative, the discriminating factor is incremented by 4 (step 724).

If the current target cannot give rise to a global result for the current expression (step 722) or after having incremented the discriminating factor by 4 (step 724), a second test is performed (step 726) to determine whether the current target contains predicates (step 726). In the affirmative, the discriminating factor is incremented by 2 (step 728).

If the current target does not contain a predicate (step 726) or after having incremented the discriminating factor by 2 (step 728), a third test is performed (step 730) in order to determine whether the current target can generate partial results for one of the LocationPaths of the current expression (for example targets relating to the last steps of the LocationPath contained in predicates or in function calls). In the affirmative, the discriminating factor is incremented by 1 (step 732).

The indicator of the discriminating character DC is calculated as being the discriminating factor weighted by the complexity factor of the current LocationPath (step 734). It stored in the compiled representation of the current path.

An iteration of this process is repeated for each target of the current LocationPath (step 736).

When all the targets of the current LocationPath have been processed, the XPath compiler accesses the following LocationPath (step 740). The process is thus repeated for each LocationPath of the XPath expression.

When all the LocationPaths have been processed, the indicators DC are preferably sorted in decreasing order (step 742) in order to assist the decoder during the evaluation.

It should be noted that the tests performed during each of the two phases correspond to a particular implementation. This list of tests is not restrictive. It is thus possible for example to consider the position of each target in the LocationPath or its depth in an XML document, the latter point being particularly pertinent for evaluations on the fly.

Other static information can be combined with these static estimations, such as information coming from a schema, coding priorities for the structure of the XML document, in particular the EXI format information called "schema-informed grammars" or statistical information obtained dynamically. Using grammars generated from schemas, it can be decided, at the time of integrating the XPath targets in the EXI processor, whether the path between two XPath targets is obligatory. This case arises in particular when a grammar has only one production.

In this case, if two XPath targets, or more, are linked by an obligatory path, the first target being activated, the second will be also. It is then possible to modify the indicator of the discriminating character of these XPath targets so that the second XPath target is sought only when the first target is activated.

In order to apprehend information of the schema type, a schema interpreter can be associated with the XPath compiler. Thus, during the compilation step 610 in FIG. 6, the schema interpreter can, for a given XPath target, recover the corresponding type. For this type it can, by running through the description thereof, determine whether certain child elements or attributes are optional, for example whether the attribute minOccurs is equal to zero or if the attribute use has the value optional. In this case, these elements have a more discriminating character than the child elements or attributes having an attribute such that "use=required". This indication is supplied to the XPath compiler, who can use it to weight the indicator of the discriminating character of the targets corresponding to the following steps. The weighting can be carried out by adding a test to the character, optional or not, or of an element or attribute at tests 722, 726, and 730 in FIG. 7.

According to a preferred implementation of the second embodiment, a mechanism for storing statistics on the targets encountered during the different runs through various binary XML documents is implemented during the evaluation phase and more precisely at the time of access to the targets linked to an item to be decoded (step 640 in FIG. 6). This statistical information makes it possible to weight the discriminating factors of the various targets through their frequency of occurrence. Thus, the more frequent the passage from one item to another, the less important will be the discriminating factor of the corresponding target. As a result, from one evaluation to another or even in the course of an evaluation, considering the statistics accumulated on the part of the document already run through, the indicators of the discriminating character may change in order to represent the structure of the documents on which the expressions were evaluated more than the complexity of these expressions.

FIG. 8 illustrates an example of implementation of this mechanism with the XPath /a/b[@id]/c evaluated on the two XML documents 800 and 805.

The phase of analysis of the XPath expression (step 615 in FIG. 6) indicates the target corresponding to the passage from an element b to an element c as the more discriminating, as shown in FIG. 8 (references 820 and 825 corresponding respectively to the Fast-Infoset and EXI recommendations). The statistic of the document 800 does however contradict this estimation in so far as any element b of this document has an element c while only one has the attribute id. Use of the statistics storage mechanism during the evaluation of the XPath expression on the document 800 makes it possible to obtain the most discriminating targets as shown (references 810 and 815).

Conversely, the evaluation of the same XPath expression on a document of the type 805, corresponding to the analysis described with reference to step 615 in FIG. 6, shown with the references 840 and 845, is more effective than the use of the mechanism based on a statistical analysis the result of which is illustrated with the references 830 and 835. It should be noted that an application implementing the invention could benefit from a double statistics storage mode: a first document-oriented mode for storing different statistics for each document and thus proposing more pertinent indicators of the discriminating character and a second global mode, less expensive in terms of memory, for storing the statistics of all the documents encountered and therefore providing indicators of the discriminating character that are less pertinent than those of the first mode. The application can also choose not to use the statistics and to consider only the static information resulting from the analysis of the expressions and any data of the schema type or structure coding parameters.

As indicated previously, the EXI recommendations are based on the use of decoding tables specific to each element that make it possible to connect the XML items to one another. Such coupling allows in particular very good compression of the documents. In the same way, XPath establishes relationships between items and it is possible to take advantage of this similarity in the configuration and evaluation steps.

The step of compiling an XPath expression (step 610 in FIG. 6) is therefore adapted to the EXI recommendations in that it is possible to create XPath targets that do not correspond exactly to XPath steps but to the link existing between two XPath steps in order to be able to integrate the XPath steps at the level of the productions in accordance with the EXI recommendations.

It is possible to define the following four types of XPath target:

the Xpath targets of type 1 effecting a direct relationship between two XML items, for example if a/b generates a target a->b and a[@b] generates a target a->@b. The XPath targets of type 1 connect two grammars (element to element) or a grammar and a structure (in the case of element to attribute) to each other and correspond to a single production in a grammar of the EXI type. These targets have an initial grammar (the grammar of a for a/b) and a final grammar (the grammar of b for a/b);

the XPath targets of type 2 effecting an indirect relationship between two XML items, for example if /a or //a generates a target connecting two items indirectly. The XPath targets of type 2 define solely a final grammar (the grammar of /a for example) and can correspond to an indeterminate number of productions;

the XPath targets of type 3 effect a relationship between an XML item and a set of XML items, for example a/text( ) and a/*,a/@*/. The XPath targets of type 3 define an initial grammar, a generic production and/or one or more specific productions; and the XPath targets of type 4 do not define a relationship between named items, for example */*[namespace-uri( )'http://example.org']. The Xpath targets of type 4 cannot in advance be linked to productions or grammars. Because of this, these targets are to be tested and possibly integrated for each new grammar. These targets can also require tests for each new element or type of item, in which case, according to the constraints of the system, it is possible to factorize these targets in a particular list tested for each new element or item type.

It may be noted that EXI grammars make it possible to take account of the knowledge of an XML system by means of the insertion of very precise rules. The integration of the XPath targets at the level of the EXI rules thus makes it possible to potentially improve the performance of the XPath evaluation without taking direct account of the XML schema at the level of the XPath evaluation (possible method but potentially complex and therefore expensive).

Figure 9:
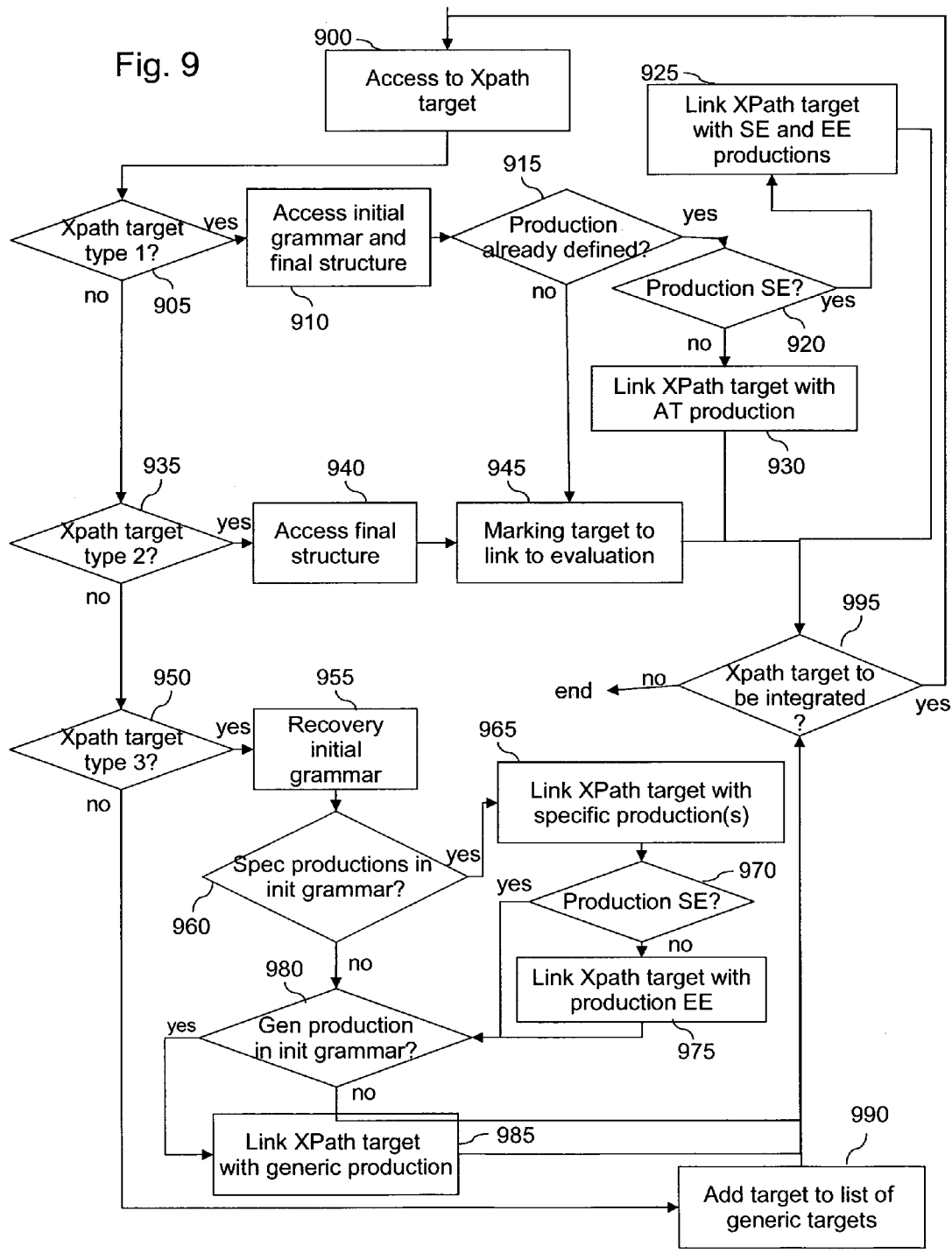
FIG. 9 illustrates the integration of the XPath targets during the configuration of the binary decoding tables when the EXI recommendations are implemented.

FIG. 9 illustrates the step of integrating the XPath targets during the configuration of the binary decoding tables when the EXI recommendations are implemented.

An iteration is performed on each XPath target to be integrated (step 900). When all the XPath targets have been integrated, the process ends (step 995).

When an XPath target is accessed, a test is performed for determining the type of the target (steps 905, 935 and 950) and carrying out the corresponding processing.

If the XPath target accessed is a type 1 target (step 905), the initial grammar and the final structure are accessed (step 910). A test is then performed in order to determine whether a specific production connecting the grammar and structure is defined in the initial grammar (step 915). If a specific production connecting the grammar and structure is defined in the initial grammar, another test is performed in order to determine whether the production corresponds to a start of element, called SE (step 920). The result of the test can also be determined by the type of AxisSpecifier of the corresponding step.

If the production corresponds to a start of element, this signifies that the final grammar is already defined and that the target can be associated with the corresponding production at the end of the element, called EE, of the final grammar. The XPath target is then linked with the productions SE and EE (step 925). In the contrary case, the production being of the attribute type, called AT, the specific production and the XPath target are put in relationship (step 930).

If a specific production connecting the grammar and structure is not defined in the initial grammar, the XPath target is marked (step 945) as having to be instanced during the evaluation, when the final grammar is created or the final structure is encountered by the EXI decoder. The XPath target will then be associated with this specific production in accordance with steps 920 and 930 described previously.

A test is then performed in order to determine whether there exists another XPath target to be processed (step 995). In the affirmative, the algorithm continues at step 900. If there is no longer any XPath target to be processed the algorithm ends.

If the XPath target accessed is a type 2 target (step 935), the final structure or grammar is accessed (step 940) and then the XPath target is marked as having to be systematically linked to any production corresponding to this final grammar or structure created by the EXI decoder during the evaluation (step 945).

A test is then performed in order to determine whether there exists another XPath target to be processed (step 995). In the affirmative, the algorithm continues at step 900. If there is no longer any XPath target to be processed the algorithm ends.

If the XPath target accessed is a type 3 target (step 950), the initial grammar is accessed (step 955). A test is then performed in order to determine whether one or more specific productions defined in the initial grammar correspond to the definition of the XPath target (step 960). In the affirmative, the specific production or productions are put in relationship with the XPath target (step 965).

A test is then performed in order to determine whether one of these productions is of the SE type or not (step 970). If one of these productions is of the SE type, the XPath target is put in relationship with the production EE of the final grammar corresponding to this specific production (step 975).

If no specific production defined in the initial grammar corresponds to the definition of the XPath target or if no specific production defined in the initial grammar corresponding to the definition of the XPath target is of the SE type, a test is performed in order to determine whether a generic production is defined in the initial grammar (step 980). This depends on the value of the AxisSpecifier of the current target. If it is a case of the value "attribute::", the target is associated with the production AT(*), otherwise it is associated with the generic production SE(*) (step 985).

A test is next performed in order to determine whether there exists another XPath target to be processed (step 995). In the affirmative, the algorithm continues at step 900. If there is no longer any XPath target to be processed, the algorithm ends.

If the XPath target accessed is a type 4 target, that is to say if the XPath target accessed is neither a type 1 target (step 905) nor a type 2 target (step 935), nor a type 3 target (step 950), the XPath target is added to the list of generic targets (step 990). The targets belonging to this list are linked to the productions to which they correspond during the evaluation and identification of the corresponding items by the EXI decoder.

A test is then performed in order to determine whether there exists another XPath target to be processed (step 995). In the affirmative, the algorithm continues at step 900. If there is no longer any XPath target to be processed the algorithm ends.

It should be noted that, according to the implementation according to which only the sufficiently discriminating XPath targets are integrated, very few of these targets are actually integrated, thus reducing the cost of managing these targets.

By using a schema during the calculation of the indicators of the discriminating character, grammars can be predefined, in particular in the section called Schema-informed grammars of the EXI recommendation. Having available grammars thus predefined makes it possible to limit the number of targets to be marked (step 945) and the number of targets to be added to the list of generic targets (step 990) for which the configuration of the targets is deferred to the evaluation. The predefined grammars are then considered during steps 915, 960 and 980.

FIG. 10 presents the EXI decoding and the XPath evaluation of an XML item, or more precisely the part specific to the integration of the XPath evaluation with the binary XML decoding, the activation and deactivation of the targets according to their discriminating character and the various bottom-up and top-down evaluation modes being presented with reference to the FIG. 11.

When the binary XML stream is obtained (step 630 in FIG. 6), the EXI decoder commences by decoding the production from knowledge of the current grammar (step 1000). This current grammar corresponds to the initial grammar of the targets encountered for the given production. A test is then performed in order to determine whether the production is specific or generic (step 1005). If the production is generic, typically SE(*) or AT(*), the EXI decoder recovers the name of the XML item by decoding it from the binary XML stream (step 1010).

A test is then performed in order to verify whether the structure or grammar of the associated XML item exists (step 1015). If no item structure or grammar exists, the EXI decoder creates such a structure or grammar (step 1020) and at the same time verifies whether generic XPath targets (list created during the configuration, step 990 in FIG. 9) can be compared with the grammar. A specific production is then created in the initial grammar (step 1025). This structure is a grammar for an element and a dictionary for an attribute. This step can require the creation of such a structure.

A test is then performed to enable the decoder to determine whether the structure is linked to one or more XPath targets (step 1030). In the affirmative, another test is performed in order to determine whether the XPath target or targets are valid with respect to the grammar used for decoding the production (step 1035). If the target or targets are valid, they are put in relationship with the production added previously during step 1025 (step 1040).

If the structure is not linked to any XPath target (step 1030), if the XPath target or targets are not valid with respect to the grammar used for decoding the production (step 1035) or after having put the valid target or targets in relationship with the production added previously, a test is performed in order to determine whether the specific production recovered or created is associated with one or more active XPath targets (step 1045). If the specific production recovered or created is not associated with any XPath target the process ends.

On the other hand, if the specific production recovered or created is associated with one or more active XPath targets (step 1045), another test is performed to determine the discriminating character of the target (step 1050), that is to say to determine whether the discriminating character indicator of the target (DC) is non-zero. If the target has a discriminating character, it is activated (step 1055), otherwise it is marked as being traversed by the EXI decoder (step 1060). This marking makes it possible in particular to update the indicator of the discriminating character of the target. It also makes it possible to quickly determine whether the XPath targets have been encountered and thus subsequently validate the activation of an XPath target.

The activation of one or more targets having a discriminating character, described with reference to FIG. 11, leads to a processing by the XPath processor.

The data supplied to the XPath processor with a view to the evaluation of the activated target or targets are here as follows:

name or identifier of the item if it is a case of an element or attribute;

value or identifier of the item if it is a case of an attribute or a text (the processing of the nodes of the comment or processing instruction type, referred to as processing-instructions, is not described here); and type of item: SE (start of element), EE (end of element), AT (attribute) or CH (text node).

The various steps in FIG. 11 are repeated for each target associated with the current item accessed (step 630 in FIG. 6).

After having activated an XPath target (step 650 in FIG. 6), a first test is performed in order to determine whether the current target gives rise to a start of global result for the expression currently being evaluated (step 1100). This may be the case if the current item is a start of element, an attribute or a text node, that is to say if it is not a case of an event of the EE type. In the affirmative, the processor requests from the EXI decoder the parent targets of the current target (step 1105) in order to verify that these have all been traversed (step 1110).

The determination of the parent targets consists, for the decoder, of maintaining the list of these when the associated production is encountered (step 1000 in FIG. 10).

In order to check whether all the targets have been traversed, the XPath decoder checks, in the list of parent targets, that no target has a non-zero indicator of the discriminating character and that all have been marked as encountered during step 1060 in FIG. 10. If all the targets have been traversed, the XPath evaluation is carried out from the information of the current item (step 1115).

This evaluation consists here, for the XPath processor, of accessing the type of the result, in the compiled expression, and applying any standard functions or operators to the XML data accessed.

A test is then performed in order to determine whether the evaluation result obtained is of the non-empty list of nodes type (step 1120). In the affirmative, the EXI decoder is informed that it must henceforth reconstruct the XML document from the current item, and until the XPath processor indicates to it an end of result (step 1125). On the other hand, if the result type is not a list of nodes or if the list of nodes is empty (step 1120), the result is sent to the EXI decoder, which can then supply it to the application (step 1130).

A test is then performed in order to determine whether other results are possible or not according to the construction of the expression (step 1135). If it is the only result and if no expression is to be evaluated, the evaluation of the expression ends. On the other hand, if other results are expected at the end of this test, the decoder passes to the following item (step 635 in FIG. 6).

If not all the parent targets have been traversed (step 1110), for example if some of them have a discriminating character, then the XPath processor stores the information relating to the current item (step 1140) in order to allow the XPath evaluation when all the parent targets have been validated. The decoder next passes to the following item (step 635 in FIG. 6).

If the current target does not give rise to a global result start for the expression currently being evaluated (step 1100), a test is performed to determine whether the current XPath target can produce a partial result (step 1145), for example a result for a predicate or for an operand of a comparison expression. In the affirmative, the processor requests of the EXI decoder the list of parent targets for the current target (step 1150) in order to verify that these have all been traversed (step 1155). This can be considered to be a bottom-up evaluation.

If all the targets have been traversed the XPath evaluation is performed from the information of the current item (step 1160), in a similar fashion to step 1115. In other words, the XPath processor checks whether the partial result start can lead to a global result start for the expression currently being evaluated (the algorithm effects a loop from step 1100). This may be the case if a predicate on a target corresponding to a predicate comes to be resolved and all the other targets have already been resolved.

If not all the parent targets have been traversed (step 1155), the XPath processor stores the information relating to the current item (step 1140) in order to allow the XPath evaluation when all the parent targets have been validated. The decoder then passes to the following item (step 635 in FIG. 6).

If the current XPath target cannot produce a partial result (step 1145), there is no start of result, neither partial nor global. This may correspond to an end of element. A test is then performed in order to determine whether the current item makes it possible to indicate a partial result end, or even an absence of partial result, or not (step 1165).

If it is a case of a partial result end, the XPath processor ceases to store the XML items currently being decoded (1170), resets the target to the non-traversed state and loops back to step 1100 in order determine whether or not this partial result end enables it to find a partial or global result.

If it is not a case of a partial result end (step 1165), the XPath processor checks whether it is a case of a global result end (step 1175), that is to say here whether the current item corresponds to the closing tag of the result currently being reconstructed. In the affirmative, the current target is marked as non-traversed and the EXI decoder is reset to decoding mode without reconstruction (step 1180). The processing continues by considering the following item.

If it is not a case of a global result end (step 1175), a test is performed (step 1185) in order to determine whether the current item corresponds to an end of element (type EE). In the affirmative, the current target is reset to the "non-traversed" state (step 1190), otherwise the current target is marked as "resolved" (step 1195). The processing continues with the decoding of the following item.

The detection of the ends of results (steps 1165 and 1175) and the resetting to the non-traversed state of the targets (steps 1170, 1180 and 1190) is permitted since the productions EE are also attached to targets, which makes the aforementioned steps automatic.

An implementation has been presented according to which all the XPath targets are integrated in the EXI processor. However, only a subset of the XPath targets, for example the most discriminating XPath targets, can be integrated in the EXI processor. It may also be decided not to integrate the XPath targets that can be validated from the history of the XML elements and grammars that the EXI processor necessarily stores for the processing of the document. This makes it possible to reduce the excess cost of the XPath evaluation, in particular to avoid the marking of these targets. In this case, the steps of validation of the previous XPath targets (step 1110 and 1150) are adapted accordingly. The marking no longer being obligatorily managed for all the XPath targets, the parent XPath targets must be validated from the history of the XML elements and the grammars that the EXI processor stores for the processing of the document.

By way of illustration, the object of the following example is the evaluation of the expression 510 in FIG. 5 of the XML document 500 in question coded according to a binary format.

First of all the XPath compiler receives the expression 510 and breaks it down into a series of steps to be evaluated, here the steps "/", "bookstore", "book" and "editor".

Thus the type 1 targets of the expression 510 correspond to the transitions "/->bookstore", "bookstore->book" and "book->editor". The initial grammar of the first target is the default grammar "StartDocument" and its final grammar is the grammar "StartTagbookstore". The initial grammar of the second is "StartTagbookstore" and its final grammar "StartTagbook". Finally, the initial grammar of the last target is "StartTagbook" and its final grammar "StartTageditor". The decoding tables of the EXI decoder are initialized with the three targets linked to their corresponding initial grammars so that, when the productions corresponding to their final grammars are inserted in their initial grammars, the target is connected to this production.

The transition "/->bookstore" is linked to the production SE (bookstore) ElementContent 0 of the default grammar "DocContent", the transition "bookstore->book" is linked to the production SE (book) ElementContent 0 of the grammar "StartTagbookstore" and the transition "book->editor" is linked to the production SE (editor) ElementContent 0 of the grammar "StartTagbook".

According to a solution of the top-down type, the evaluation of an XPath expression can begin when the expression is compiled and thus linked to the decoding tables of the EXI decoder. For these purposes, the EXI decoder reads the binary XML document event by event. The first event corresponds to the start of the document (SD). The second event, corresponding to the start of element "bookstore", gives rise to the creation of the grammar "StartTagbookstore" to which the target "/->bookstore" is linked. This target is activated on this occasion by the EXI decoder. During this activation, the module managing the solutions of the XPath processor takes over in order to check whether this target corresponds to a result or requires the storage of reconstructed XML information. This target not being the final target of the XPath expression to be evaluated, no result is to be sent and no XML reconstruction is therefore necessary. The decoder therefore continues to run through the binary XML document. When the element "book" is identified, the grammar "StartTagbook", to which the target "bookstore->book" is linked, is created. The target "bookstore->book" is therefore activated. As before, no result is sent but the XPath processor takes over in order to ensure this. The decoder continues reading until the end of the element "book", during which the target "bookstore->book" is deactivated and where the XPath processor takes over again in order to check that no intermediate result is to be deleted from its memory. The decoder thus continues until the identification of the start of element "editor", which leads to the creation of a grammar "StartTageditor", to which the final target "book->editor" is linked. The identification of the start of element "editor" gives rise to the reconstruction of this element, the XPath processor detecting that it is a case of the last target of the expression.

According to the invention, the targets generated at the end of the compilation are accompanied by information relating to their discriminating character. Thus, for the XPath expression 510, the last target being judged the most discriminating, it is annotated as such. During the evaluation, as described previously, the EXI decoder runs through the binary XML document and encounters the start of document and start of the element "bookstore" events. The EXI decoder then creates the grammar "StartTagbookstore" with which a target is associated. However, this not being discriminating, it is not activated and therefore does not hand over to the XPath processor. However, this target is marked as traversed by the EXI decoder. The decoder continues its reading with the event "book", which produces the same effect as the previous event. The reading continues without any target being concerned until the end of the element "book", during which the EXI decoder marks the target "bookstore->book" as non-traversed. The following start of element, "book", once again makes it possible to mark the target as traversed. Then comes the start of the element "editor", which gives rise to the creation of the grammar "StartTageditor", to which the final target "book->editor" is linked. This target is marked as discriminating (indicator DC non-zero) and therefore gives rise to its being taken over by the XPath processor. At this moment, the XPath processor detects that it is a case of the last target of the expression and indicates to the EXI decoder that the reconstruction of the current element is required. The latter goes into reconstruction mode, verifies that the previous steps have indeed been traversed and, where applicable, reconstructs all the XML events encountered until the XPath processor indicates to it the end of the result. The end is reached when the grammar currently being used by the EXI decoder is no longer the "StartTageditor" grammar but becomes its parent grammar.

As illustrated by this example, the time passed in the XPath processor is reduced. Consequently more time is allocated to running through the binary XML document which, for applications implementing the invention, accelerates access to the parts of the document.

According to another implementation of the second embodiment, the invention is implemented for XML documents in accordance with the Fast-Infoset recommendations.

Integration of the XPath targets according to the Fast-Infoset recommendations differs from the integration according to the EXI recommendations because of the different nature of the decoding tables. According to the EXI recommendations, links are preserved between XML items whereas, according to the Fast-Infoset recommendations, no link is preserved. Because of this, the XPath targets compiled must be linked to an element or attribute name. Because of the representation of the tables of the Fast-Infoset type, the XPath targets are compiled conventionally and generally correspond to an XPath step.

The XPath targets compiled being linked to an element or attribute name, the use of the indicator of the discriminating character applies solely to the targets linked to an attribute or element name. The XPath targets of the text node type or the anonymous XPath targets of type 3 or 4 are therefore naturally classified as non-discriminating targets. It can thus be decided not to integrate them in the Fast-Infoset processor.

FIG. 12 shows an example of a configuring algorithm adapted to the Fast-Infoset recommendations.

It should be specified first of all that the indexed items here retain a tag related to the XPath search. At the time of the addition of an item to the encoding table, a search is performed in order to determine whether the item is related to an XPath target via a map mechanism which involves an additional processing operation for XPath (search in a map). The maps are specialized for the names present in the XPath expressions, and it is therefore a case of a criterion depending, for example, on the length of the string and/or the first letter, for minimizing the cost. Unlike the implementation of the invention according to the EXI recommendations, the evaluation of the secondary targets is centralized here.

An iteration is carried out on each XPath target to be integrated (step 1200), each target being accessed sequentially (step 1205). When all the XPath expressions are integrated, the processing is terminated.

After accessing a target, a test is performed in order to determine whether the XPath target is linked to a particular element, attribute or value name (step 1210). By way of illustration, the expression /a/b/*[namespace-uri( )="] contains a target for the element 'b' (target linked to a name) and a target /*[namespace-uri( )="] (target not linked to a name).

If the XPath target is not linked to particular name, the XPath target is inserted within the list of generic targets (step 1215). It should however be remarked that, because of the discriminating character applying solely to the targets linked to an attribute or element name, this step is rarely used.

This list, described in more detail in the remainder of the description, serves in particular to link XPath targets during the decoding of any new qualified name (of an element or attribute) in the Fast-Infoset recommendations. The processing of the target is then terminated. The next target, if there is one, is then selected (steps 1200 and 1205), otherwise the process ends.

If the XPath target is linked to a particular name, an access to the decoding table linked to this target is performed (step 1220) and a test is performed in order to determine whether this table contains the item designated by the XPath target (step 1225). The expression /a/b contains for example a target for the element 'b'. This test thus consists of searching as to whether the element decoding table defines an element 'b'.

If this table contains the item designated by the XPath target, the decoding structure relating to the item is accessed (step 1230) and this structure is coupled with the XPath target (step 1235). The next target, if there is one, is then selected (steps 1200 and 1205), otherwise the process ends.

If the decoding table does not contain the item corresponding to the XPath target, a decoding structure associated with the item is created (step 1240) and this structure is added to the structure list associated with the decoding table (step 1245). This list, described in more detail in the remainder of the description, serves in particular to link XPath targets during the decoding of any new item relating to a decoding table. A new item is an item encoded literally (item not predefined and not yet encountered during the decoding). This structure is then coupled with the XPath target (step 1235). The next target, if there is one, is then selected (steps 1200 and 1205), otherwise the process ends.

FIG. 13 presents the decoding of a binary XML document of the Fast-Infoset type with evaluation of an XPath expression. After accessing the XML item that is to be processed (step 1300), a test is performed in order to determine whether it is a case of an item coded by indexing or not (step 1305). In the affirmative, the structure of the item is extracted from the decoding table (step 1310). This structure then makes it possible to determine whether the XPath targets are linked to this item (step 1315). If no target is linked to this item, the processing of the item particular to the XPath evaluation is terminated.

Otherwise, if one or more XPath targets are linked to the item, a step of marking and activating the Xpath targets is performed (step 1320) in a similar fashion to that described previously for the EXI processing (steps 1050, 1055, 1060 in FIG. 10).

In the same way, certain XPath targets are not necessarily integrated in the XPath processor (these XPath targets are then validated during steps 1110 and 1155 in FIG. 11).

If the item is not coded by indexing (step 1305), that is to say if the item is coded literally, a search is carried out in the list of non-linked named targets created during the configuration phase in order to determine whether the item is situated therein (step 1325). If the item is found in the list, the decoding structure of the item is accessed and inserted in the decoding table (step 1330). The algorithm then continues with the test aimed at determining whether XPath targets are linked to this item (step 1315).

If the item is not found in the list of non-linked named targets, a decoding structure of the item is created and added to the decoding table (step 1335). A test is then performed in order to determine whether generic XPath targets are applicable to this item (step 1340). If some generic XPath targets are applicable, they are associated with the decoding structure of the item (step 1345). The algorithm continues with the marking and activation step for the XPath targets (step 1320).

If no generic XPath target is applicable (step 1340), the processing of the item particular to the XPath evaluation is terminated.

It should be noted here that the second embodiment can be considered as an improvement of the first one. As a consequence, the given examples of implementing the second embodiment of the invention according to the EXI and Fast-Infoset recommendations may be obviously simplified to implement the invention according to the first embodiment and the EXI and Fast-Infoset recommendations. Examples of such implementations are described in French Patent Applications No. 08 05650 and No. 08 51971, of which priority is claimed, and of which the disclosures are herein incorporated by reference in their entirety.

A device adapted to implement the invention or part of the invention is illustrated in FIG. 14. The device 1400 is for example a workstation, a microcomputer or a personal assistant.

Here the device 1400 comprises a communication bus 1405 to which the following are connected:
 a central processing unit or microprocessor 1410 (CPU);
 a read only memory 1415 (ROM) capable of containing the programs "Prog", "Prog1" and "Prog2";
 a random access memory or cache memory 1420 (RAM) comprising registers adapted to record variables and parameters created and modified during execution of the aforementioned programs; and
 a communication interface 1450 adapted to transmit and receive data.

Optionally, the device 1400 can also have:
 a screen 1425 making it possible to display data and/or serve as a graphical interface with the user, who can interact with the programs according to the invention, using a keyboard and mouse 1430 or other pointing device, a touch screen or a remote control;
 a hard disk 1435 capable of including the aforementioned programs "Prog", "Prog1" and "Prog2" and data processed or to be processed according to the invention; and
 a memory card reader 1440 adapted to receive a memory card 1445 and read therefrom or write thereto data processed or to be processed according to the invention.

The communication bus allows communication and interoperability between the different elements included in the device 1400 or connected thereto. The depiction of the bus is not limiting and, in particular, the central unit is capable of communicating instructions to any element of the device 1400 directly or by means of another element of the device 1400.

The executable code of each program allowing the programmable device to implement the processes according to the invention can be stored, for example, on the hard disk 1435 or in the read only memory 14315.

According to a variant, the memory card 1445 can contain data and the executable code of the aforementioned programs which, once read by the device 1400, is stored on the hard disk 1435.

According to another variant, the executable code of the programs can be received, at least partially, by means of the interface 1450, in order to be stored in a manner identical to that described previously.

More generally, the program or programs can be loaded into one of the storage means of the device 1400 before being executed.

The central unit 1410 will command and direct the execution of the instructions or software code portions of the program or programs according to the invention, instructions that are stored on the hard disk 1435 or in the read only memory 1415 or in the other aforementioned storage elements. At power-up, the program or programs that are stored in a non-volatile memory, for example the hard disk 1435 or the read only memory 1415, are transferred into the random access memory 1420 which then contains the executable code of the program or programs according to the invention, as well as registers for storing the variables and parameters necessary for implementation of the invention.

It should be noted that the communication equipment comprising the device according to the invention can also be programmed equipment. This equipment then contains the code of the computer program or programs for example fixed in an application-specific integrated circuit (ASIC).

Naturally, in order to satisfy specific requirements, a person competent in the field of the invention can apply modifications to the preceding description.

The invention claimed is:

1. A method of analyzing and processing an expression of the XPath type for evaluating said expression on a set of data of the binary XML type, an XPath type expression selecting relevant XML data, said set of data of the binary XML type being associated with at least one decoding table, the method comprising the following steps:
    generating a list comprising a set of at least one target from said expression of the XPath type, said at least one target being associated with a selection of XML data and representing a step in an evaluation of said expression of the XPath type;
    determining, for said at least one target, a parameter representing a discriminating character of said at least one target, based on a number of selected XML data associated with the at least one target, the at least one target being less discriminating as the number of selected XML data associated with the at least one target increases;
    linking the parameter representing a discriminating character with the at least one target;
    integrating the at least one target and linked parameter representing a discriminating character to said at least one decoding table;
    accessing at least one part of said set of data of the binary XML type;
    identifying at least one reference to an item in said at least one decoding table using said at least one part of said set of data of the binary XML type; and
    accessing said at least one target integrated to said at least one decoding table using said at least one reference.

2. The method according to claim 1, further comprising a step of analysis of said at least one target, said at least one target being integrated to said at least one decoding table in response to said analysis step.

3. The method according to claim 1, further comprising a step of analyzing said at least one target, said parameter representing a discriminating character of said at least one target being determined according to the result of said analysis of said at least one target.

4. The method according to claim 3, according to which said step of determining said parameter representing a discriminating character of said at least one target comprises a step of estimating the complexity of at least one location path of said Xpath-type expression, said at least one target belonging to said at least one location path and said parameter representing a discriminating character being weighted by said estimated complexity.

5. The method according to claim 1, also comprising a step of receiving at least one item of information representing said set of XML-type data, said parameter representing a discriminating character of said at least one target being determined according to said at least one item of information representing said set of XML-type data.

6. The method according to claim 5, according to which said at least one item of information representing said set of data of the XML type is information of the schema and/or statistical type.

7. The method according to claim 1, according to which a parameter representing a discriminating character is determined for each target in a plurality of targets in said set of at least one target, the method also comprising a step of determining the evaluation order of each target in said plurality of targets according to the parameter representing a discriminating character associated with each target in said plurality of targets.

8. The method according to claim 1, further comprising a step of determining the type of said at least one target, said step of integrating said at least one target to said at least one decoding table being determined in response to said step of determining the type of said at least one target.

9. The method according to claim 1, further comprising a step of marking or activating said at least one target.

10. The method according to claim 9, wherein said step of accessing said at least one target integrated to said at least one decoding table comprises a step of accessing a parameter representing a discriminating character associated with said at least one target, based on a resulting number of selected XML data associated with the target, using said at least one reference, wherein said at least one target is marked or activated according to the parameter representing a discriminating character associated with said at least one target.

11. The method according to claim 1, further comprising a step analyzing said at least one decoding table and a step of creating an item structure in response to said analysis step.

12. The method according to claim 1, further comprising a step of decoding said at least one part of said data of the binary XML type.

13. The method of evaluating at least one XPath-type expression on a set of XML-type data, an XPath type expression selecting relevant XML data, at least one coding table being associated with said set of XML-type data, the method comprising the following steps:
    analysis and processing of said XPath-type expression comprising the steps of:
    generating a list comprising a set of targets from said XPath-type expression, each target of the list being associated with a selection of XML data and representing a step in an evaluation of said expression of the XPath type;
    determining, for at least one target in said set of targets, a parameter representing a discriminating character of said at least one target, based on a number of selected XML data associated with the target, the target being less discriminating as the number of selected XML data associated with the target increases;
    linking the parameter representing a discriminating character with the at least one target;
    integrating the at least one target and linked parameter representing a discriminating character to said at least one decoding table;

accessing at least part of said set of XML-type data;
identifying at least one reference to an item in said at least one coding table from said at least one part of said set of XML-type data;
accessing said at least one target linked to said at least one coding table and the parameter associated with said at least one target, from said at least one reference; and
marking or activating said at least one target according to the parameter associated with said at least one target.

14. A non-transitory computer-readable storage medium, removable or not, able to be partially or totally read by a computer or a microprocessor containing code instructions of a computer program for executing each of the steps of the method according to claim 1.

15. A device for analyzing and processing an expression of the XPath type for evaluating said expression on a set of data of the binary XML type, an XPath type expression selecting relevant XML data, said set of data of the binary XML type being associated with at least one decoding table, the device comprising a processor configured for carrying out the steps of:
generating a list comprising a set of at least one target from said expression of the XPath type, said at least one target being associated with a selection of XML data and representing a step in an evaluation of said expression of the XPath type;
determining, for said at least one target, a parameter representing a discriminating character of said at least one target, based on a number of selected XML data associated with the at least one target, the at least one target being less discriminating as the number of selected XML data associated with the at least one target increases;
linking the parameter representing a discriminating character with the at least one target;
integrating the at least one target and linked parameter representing a discriminating character to said at least one decoding table;
accessing at least one part of said set of data of the binary XML type;
identifying at least one reference to an item in said at least one decoding table using said at least one part of said set of data of the binary XML type; and
accessing said at least one target integrated to said at least one decoding table using said at least one reference.

16. The device according to claim 15, wherein the processor is further configured for carrying out the step of determining, for said at least one target, a parameter representing a discriminating character of said at least one target, based on a resulting number of selected XML data associated with the target, said parameter representing a discriminating character being linked with said at least one target to said at least one decoding table.

17. A device according to claim 15, wherein the processor is further configured for carrying out the step of marking or activating said at least one target.

18. A device for evaluating at least one expression of the XPath type on a set of data of the XML type, an XPath type expression selecting relevant XML data, at least one coding table being associated with said set of data of the XML type, the device comprising a processor configured for carrying out the steps of:
analyzing and processing said expression of the XPath type comprising the steps of:
generating a list comprising a set of at least one target from said XPath-type expression, the at least one target of the list being associated with a selection of XML data and representing a step in an evaluation of said expression of the XPath type;
determining, for said at least one target, a parameter representing a discriminating character of said at least one target, based on a number of selected XML data associated with the target, the target being less discriminating as the number of selected XML data associated with the target increases;
linking the parameter representing a discriminating character with the at least one target;
integrating the at least one target and linked parameter representing a discriminating character to said at least one decoding table;
accessing at least part of said set of XML-type data;
identifying at least one reference to an item in said at least one coding table from said at least one part of said set of XML-type data;
accessing said at least one target linked to said at least one coding table and the parameter associated with said at least one target, from said at least one reference; and
marking or activating said at least one target according to the parameter associated with said at least one target.

* * * * *